(12) United States Patent
Ogawa et al.

(10) Patent No.: US 10,277,761 B2
(45) Date of Patent: Apr. 30, 2019

(54) IMAGE READING DEVICE THAT READS IMAGE OF DOCUMENT, AND IMAGE FORMING DEVICE

(71) Applicant: KYOCERA Document Solutions Inc., Osaka (JP)

(72) Inventors: Naozumi Ogawa, Osaka (JP); Masuo Kawamoto, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/854,338

(22) Filed: Dec. 26, 2017

(65) Prior Publication Data

US 2018/0183945 A1    Jun. 28, 2018

(30) Foreign Application Priority Data

Dec. 28, 2016  (JP) ................................ 2016-256868

(51) Int. Cl.
*H04N 1/00* (2006.01)
*G03G 21/16* (2006.01)
*G03G 15/00* (2006.01)

(52) U.S. Cl.
CPC ......... *H04N 1/0083* (2013.01); *G03G 15/605* (2013.01); *G03G 21/1661* (2013.01); *H04N 1/00559* (2013.01); *H04N 1/00798* (2013.01); *G03G 2215/00198* (2013.01); *G03G 2221/16* (2013.01)

(58) Field of Classification Search
CPC ..................................................... H04N 1/0083
USPC .......................................................... 358/1.15
See application file for complete search history.

(56) References Cited

U.S. PATENT DOCUMENTS

| | | | |
|---|---|---|---|
| 2001/0040705 A1* | 11/2001 | Yokota ................. | H04N 1/0083 358/474 |
| 2006/0192833 A1* | 8/2006 | Samoto .................... | B41J 29/02 347/108 |
| 2010/0110159 A1* | 5/2010 | Kawamoto ........ | H04N 1/00519 347/224 |
| 2018/0183958 A1* | 6/2018 | Ishii .................... | H04N 1/00708 |

FOREIGN PATENT DOCUMENTS

JP          2010-107825 A      5/2010

* cited by examiner

*Primary Examiner* — Jacky X Zheng
(74) *Attorney, Agent, or Firm* — IP Business Solutions, LLC

(57) ABSTRACT

An image reading device includes a loading plate, a frame, a scanner, a flat cable, and a holding member. The scanner includes a reading mechanism that extends in a main scanning direction and reciprocates in a sub-scanning direction on the side of a bottom surface opposite to an upper surface on which a document on the loading plate in the frame is loaded. The flat cable extends in the frame so that a width direction of the flat surface follows a direction orthogonal to the bottom surface of the loading plate. The holding member reciprocates together with the scanner and holds a part of the flat cable from the side on a main surface of the frame.

8 Claims, 24 Drawing Sheets

IMAGE READING DEVICE THAT READS IMAGE OF DOCUMENT, AND IMAGE FORMING DEVICE

INCORPORATION BY REFERENCE

This application claims priority to Japanese Patent Application No. 2016-256868 filed on Dec. 28, 2016, the entire contents of which are incorporated by reference herein.

BACKGROUND

The present disclosure relates to an image reading device and an image forming device including the image reading device.

An image reading device that reciprocally moves scanner in a sub-scanning direction, the scanner having a reading unit that extends in a main scanning direction and reads an image of a document loaded on a loading plate is known. In the image reading device, since a cable connected to the scanner frequently bends according to the reciprocating movement of the scanner, a flat cable resistant to bending is used for connection with the scanner.

SUMMARY

As an aspect of the present disclosure, a technology further improved with respect to the above technology is proposed.

An image reading device according to an aspect of the present disclosure includes a loading plate, a frame, a scanner, a flat cable, and a holding member. A document to be read is loaded on the loading plate. The frame has a box shape and supports the loading plate. The scanner includes a reading mechanism that extends in a main scanning direction and reciprocates in a sub-scanning direction on the side of a bottom surface opposite to an upper surface on which a document on the loading plate in the frame is loaded. The flat cable has a planar flat surface and includes one end that is connected to a cable port provided in the scanner and the other end that is connected to the frame and extends in the frame so that a width direction of the flat surface follows a direction orthogonal to the bottom surface of the loading plate. The holding member reciprocates together with the scanner and holds a part of the flat cable from the side on a main surface of the frame.

In addition, an image forming device according to another aspect of the present disclosure includes the above image reading device and an image forming unit that forms an image read by the image reading device on recording paper.

DETAILED DESCRIPTION

An image reading device and an image forming device including the same according to an embodiment as an aspect of the present disclosure will be described below with reference to the drawings.

Embodiment 1

Figure 1:
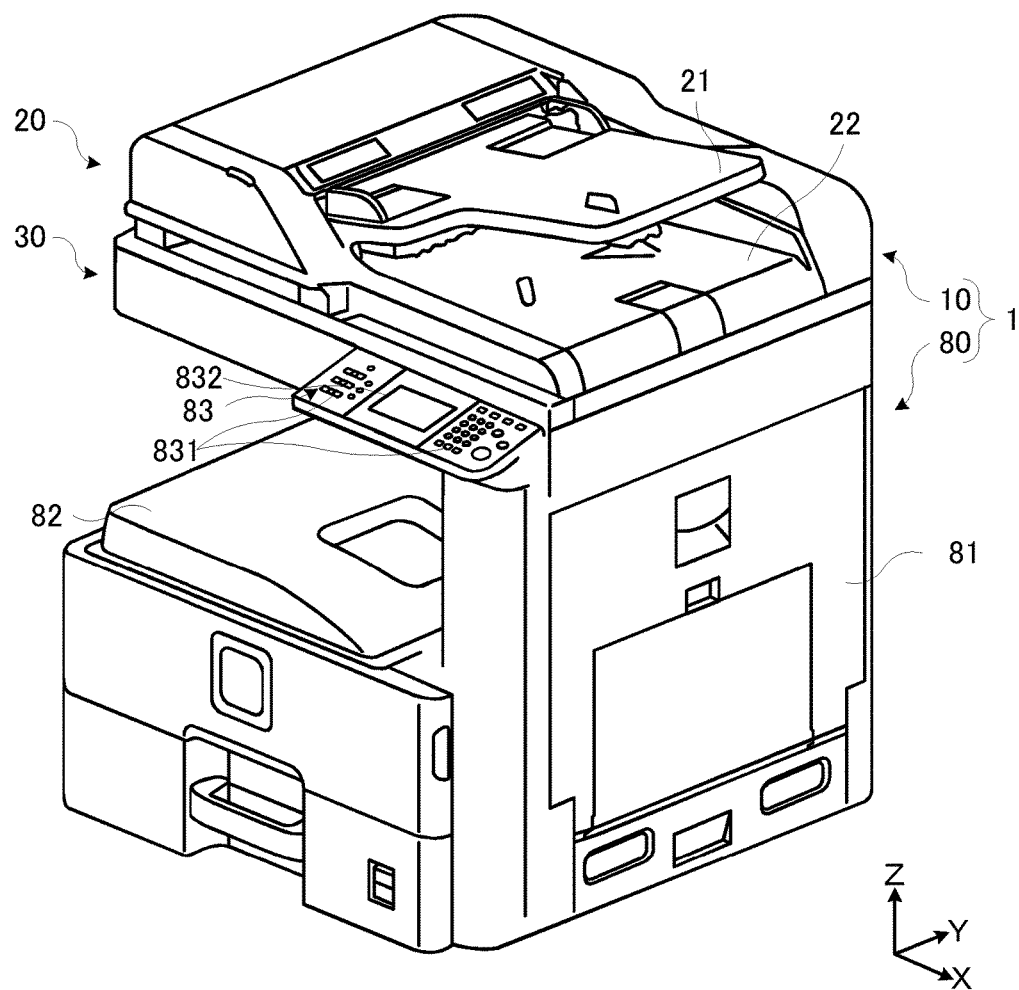
FIG. 1 is a perspective view showing an image forming device including an image reading device according to Embodiment 1 of the present disclosure.
Figure 2:
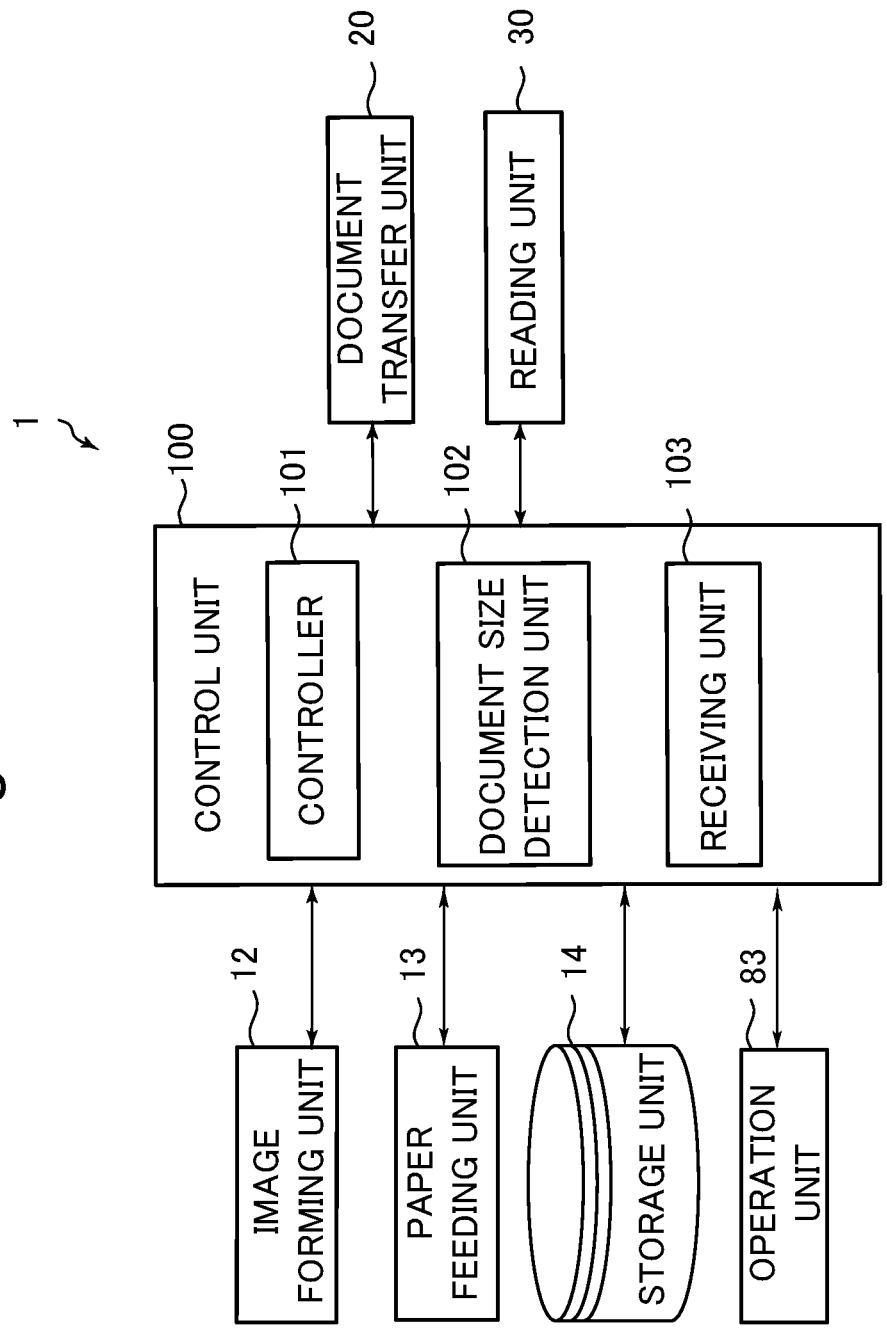
FIG. 2 is a functional block diagram showing a main internal configuration of the image forming device including the image reading device according to Embodiment 1 of the present disclosure.

FIG. 1 is a perspective view showing an image forming device including an image reading device according to Embodiment 1. FIG. 2 is a functional block diagram showing a main internal configuration of the image forming device including the image reading device according to Embodiment 1.

As shown in FIG. 1, an image forming device 1 has a schematic configuration including a device main body 80 and an image reading device 10 disposed above the device main body 80.

An image forming unit 12 and a paper feeding unit 13 shown in FIG. 2 are accommodated inside a housing 81 constituting an outer wall of the device main body 80. The image forming unit 12 includes a photosensitive drum (not shown), a charging device (not shown), an exposure device (not shown), and a developing device (not shown), and forms a toner image of a document read by the image reading device 10 on the photosensitive drum in charging, exposure, and developing processes. Then, the image forming unit 12 transfers the toner image to recording paper fed from the paper feeding unit 13 and discharges the recording paper subjected to a fixing process to a discharge tray 82.

An operation unit 83 is disposed on a front surface of the housing 81 of the device main body 80. The operation unit 83 includes a plurality of operation keys 831 such as a start key for instructing execution of an image reading job and a display unit 832 including a liquid crystal display (LCD) and an organic light-emitting diode (organic EL, OLED) display.

In addition, as shown in FIG. 2, inside the housing 81, a storage unit 14 and a control unit 100 are additionally accommodated. The storage unit 14 is a large capacity storage device such as a hard disk drive (HDD), and stores image data generated by reading the document with the image reading device 10 and various programs. The control unit 100 includes a central processing unit (CPU), a random access memory (RAM), and a read only memory (ROM). The control unit 100 functions as a controller 101, a document size detection unit 102, and a receiving unit 103 when a program stored in the ROM or the storage unit 14 is executed by the CPU.

The controller 101 has a function of controlling an operation of image forming by the image forming device 1 and an operation of image reading by the image reading device 10. The document size detection unit 102 has a function of detecting a size of a document loaded on a loading plate (contact glass) 32 to be described below (refer to FIG. 3). The receiving unit 103 has a function of receiving various instructions such as an image forming instruction and an image reading instruction based on a user operation using the operation unit 83 or the like. In addition, the loading plate 32 is a transparent plate member and is formed of a material including resins or glasses.

As shown in FIG. 1, the image reading device 10 includes a reading unit 30 and a document transfer unit 20 disposed above the reading unit 30. The document transfer unit 20 transfers a document loaded on a document loading table 21 toward the loading plate 32. The document transferred to the loading plate 32 is read by a scanner 40 (refer to FIG. 3) to be described below at a predetermined document reading position, and then discharged to a document discharge unit 22.

In addition, the document transfer unit 20 is provided to be freely openable and closable with respect to a main surface of the loading plate 32, and also serves as a document pressing member pressing the document loaded on the loading plate 32.

Figure 3:
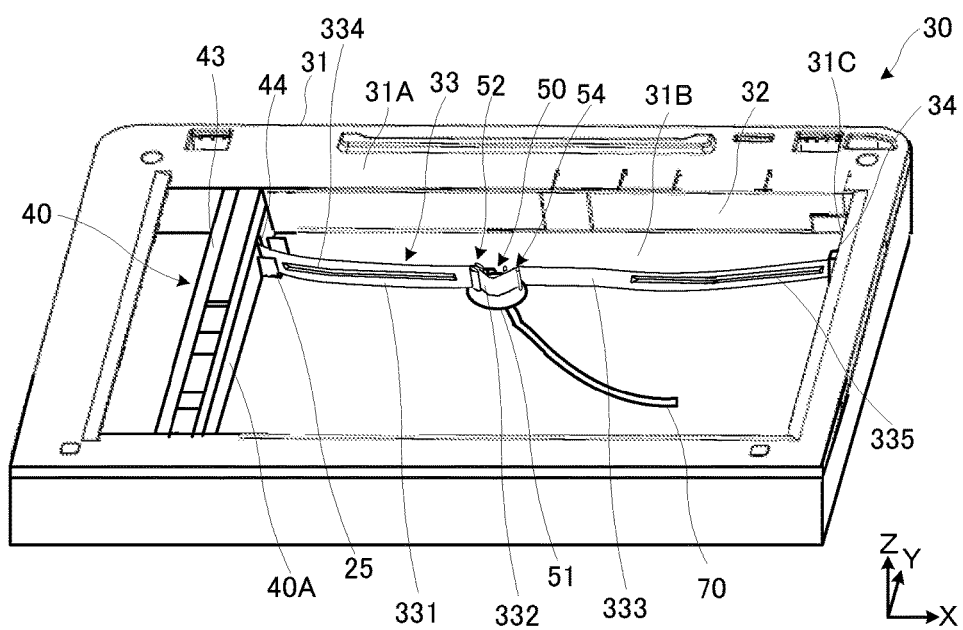
FIG. 3 is a perspective view showing a reading unit of the image reading device according to Embodiment 1 of the present disclosure.

FIG. 3 is a perspective view showing the reading unit 30. As shown in FIG. 3, the reading unit 30 includes a box-shaped housing 31 (a frame and a casing). An opening is provided on an upper surface 31A (a surface that faces the document transfer unit 20 while the document transfer unit 20 is closed) of the housing 31, and the loading plate 32 is attached to the opening.

The scanner 40 is provided on the bottom surface side opposite to an upper surface on which the document on the loading plate 32 is loaded. The scanner 40 has a reading mechanism 43 including a contact image sensor (CIS) type reading sensor that extends in a main scanning direction (the Y direction in the drawing). Since the CIS type reading sensor has a shallow depth of field, the reading mechanism 43 is in close contact with the bottom surface of the loading plate 32 with a slider (not shown) therebetween. In this state, the scanner 40 is reciprocated in the housing 31 in a sub-scanning direction (the X direction in the drawing) by a driving unit (not shown) including a motor and a gear. The example shown in FIG. 3 shows a case in which the scanner 40 is located at a predetermined home position (an end on the side in a negative X direction in the drawing). When the receiving unit 103 receives an instruction to read a document, the scanner 40 moves from the home position in a positive X direction in the drawing and reads the document loaded on the loading plate 32 under control of the controller 101. Then, when reading of the document is completed, the scanner 40 moves in the negative X direction in the drawing and returns to a location of the home position.

The reading mechanism 43 includes a light emitting unit (not shown) composed of a plurality of LEDs such as a red LED, a green LED, and a blue LED and a light receiving unit (not shown) such as a complementary metal oxide semiconductor (CMOS) image sensor. The scanner 40 emits light toward a document to be read while switching between light of the three colors of red, green, and blue with the light emitting unit and receives reflected light reflected at the document with the light receiving unit. The light receiving unit converts the received light into an electrical signal and acquires image data for one line in the main scanning direction.

The scanner 40 is electrically connected to the control unit 100 including the controller 101 that controls an image reading operation by the scanner 40 through a flat cable 33. Among side surfaces of the scanner 40, on a side surface 40A located on a side (a side in the positive X direction in the drawing) on which a housing fixing part 34 to be described below is provided, a cable port 44 that extends in a direction orthogonal to the bottom surface of the loading plate 32 is provided. More specifically, the cable port 44 is provided at an end on one side (in a positive Y direction) in the main scanning direction of the side surface 40A. One end of the flat cable 33 is connected to the cable port 44 and image data acquired by the scanner 40 is transmitted to the controller 101 through the flat cable 33. In the controller 101, various types of image processing such as digital signal conversion, shading correction, gamma correction, chromatic aberration correction, modulation transfer function (MTF) correction and scanner color correction are performed on the image data transmitted from the scanner 40. Then, image data generated by the image processing is stored in the storage unit 14 or the like.

Here, not only the above image data, but also electric power driving the scanner 40 and a control signal for controlling an image reading operation of the scanner 40 are transmitted through the flat cable 33.

The flat cable 33 is a ribbon-like cable in which a plurality of core wires arranged at regular intervals are covered with a resin film. The flat cable 33 has characteristics in which electrical characteristics can be maintained even if it is deformed and is suitable as a cable connected to the scanner 40 that reciprocates. A socket fitted to the cable port 44 is provided at one end of the flat cable 33, and a socket fitted to a pin header (not shown) provided in the control unit 100 is provided at the other end thereof.

Among side surfaces of the housing 31, on a side surface 31C located at an end (in the positive X direction in the drawing) opposite to the home position for the scanner 40 in the sub-scanning direction, the housing fixing part 34 (frame fixing part) fixing the other end of the flat cable 33 to the housing 31 is provided. The housing fixing part 34 is, for example, a clip holder, and fixes the other end of the flat cable 33 so that the width direction of the flat surface of the flat cable 33 follows the direction orthogonal to the bottom surface of the loading plate 32.

Figure 4A:
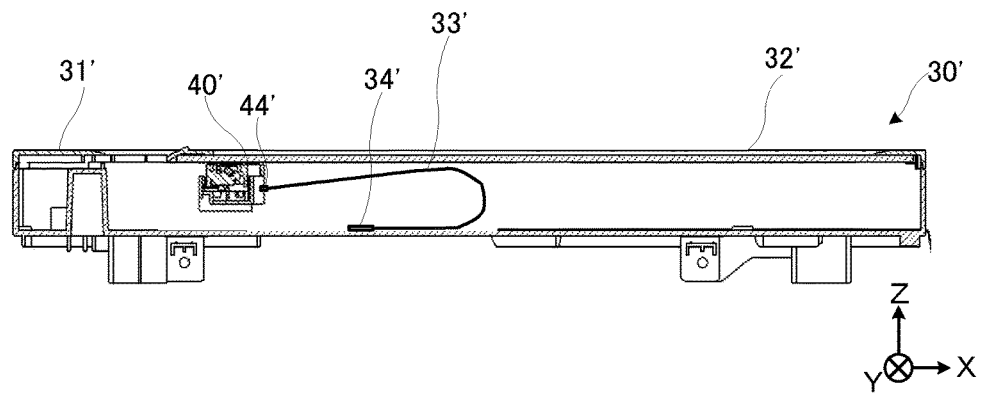
FIG. 4A and FIG. 4B are diagrams showing a state in which a flat cable is deformed in a general image reading device.
Figure 4B:
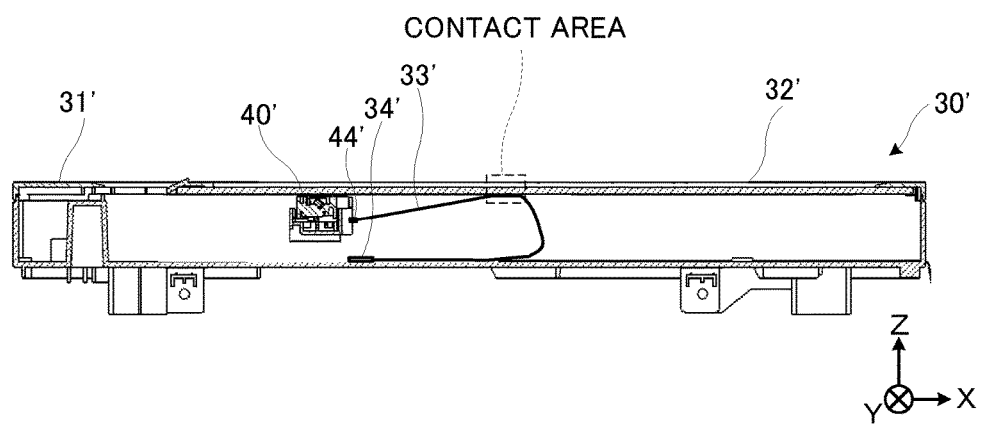

Here, in a general image reading device shown in FIG. 4A and FIG. 4B, the flat cable 33' is made to extend in the housing 31' while the flat surface of a flat cable 33' is parallel to the bottom surface of a loading plate 32' by a cable port 44' and a housing fixing part 34' that extend in the main scanning direction. In this case, depending on the position of the scanner 40', the flat cable 33' bulges and curves upward (a positive Z direction in the drawing) while describing a large circular arc, and a part of the flat cable 33' may come in contact with the loading plate 32'.

In particular, when the scanner 40' moves from the position shown in FIG. 4A to the position shown in FIG. 4B and the scanner 40' is located above the housing fixing part 34', since one end and the other end of the flat cable 33' approach each other, a part of the flat cable 33' is likely to come in contact with the loading plate 32'. When the flat cable 33' comes in contact with the loading plate 32', there is a risk of the flat cable 33' sticking to the loading plate 32' and the loading plate 32' becoming dirty.

On the other hand, in the image reading device 10 according to Embodiment 1, the flat cable 33 extends in the housing 31 so that the width direction of the flat surface follows the direction orthogonal to the bottom surface of the loading plate 32. Accordingly, even if the flat cable 33 is deformed according to the movement of the scanner 40, the flat cable 33 does not come in contact with the loading plate 32.

In addition, in the image reading device 10 according to Embodiment 1, a slide member 50 for guiding deformation of the flat cable 33 in the housing 31 is provided. A detailed configuration of the slide member 50 will be described below.

As shown in FIG. 3, on a bottom surface 31B of the housing 31, a slide path 70 including a groove recessed from the bottom surface 31B is formed. The slide path 70 is formed so as to describe an arc toward the side in a negative Y direction in the drawing and the side in the negative X direction in the drawing. In other words, the slide path 70 is formed so as to describe an arc toward the other side opposite to one side (the positive Y direction in the drawing) in the main scanning direction in which the cable port 44 is provided on the side surface 40A of the scanner 40 and the side on which the home position is provided in the sub-scanning direction. Along the slide path 70, the slide member 50 is slidably movably provided on the bottom surface 31B of the housing 31.

Figure 5A:
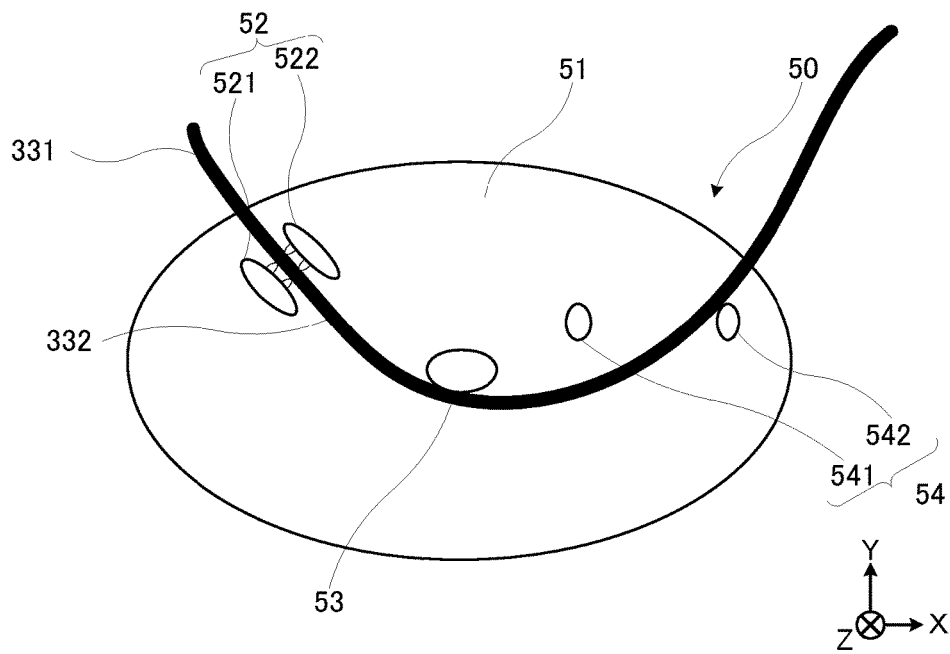
FIG. 5A and FIG. 5B are diagrams showing a configuration of a slide member of the image reading device according to Embodiment 1 of the present disclosure.
Figure 5B:
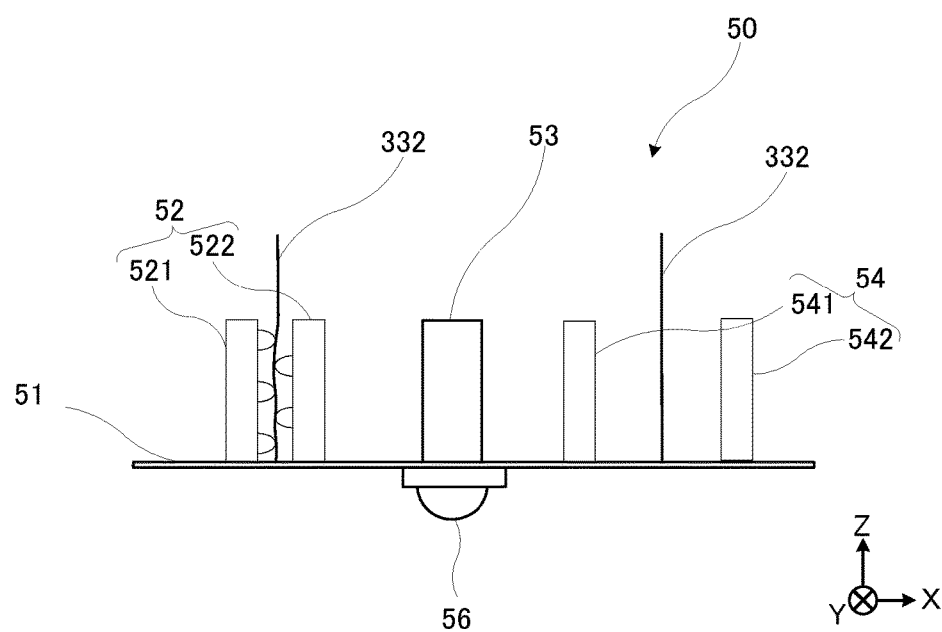

FIG. 5A and FIG. 5B are diagrams showing a configuration of the slide member 50. As shown in these drawings, the slide member 50 includes a flat base part 51 having an elliptical flat surface. In the base part 51, a hemispherical fitting part 56 that protrudes toward the side on the bottom surface 31B of the housing 31 (a negative Z direction in the drawing) is formed at the center of a surface that faces the bottom surface 31B of the housing 31. When the fitting part 56 is fitted into the groove of the slide path 70, the slide member 50 is slidably movable along the slide path 70.

In addition, on a surface opposite to the surface on which the fitting part 56 of the base part 51 is formed, a locking part 52 that protrudes toward the side on the bottom surface of the loading plate 32 (the positive Y direction in the drawing), a hook part 53, and an insertion part 54 are formed.

The locking part 52 includes a columnar first wall part 521 and a columnar second wall part 522 which are disposed to face each other. A curved part 332 located between a first extending part 331 that extends from one end connected to the cable port 44 and a second extending part 333 that extends from the other end fixed by the housing fixing part 34 within the flat cable 33 is interposed between the first wall part 521 and the second wall part 522. A plurality of protrusions are provided on opposing surfaces of the first wall part 521 and the second wall part 522, and the curved part 332 is clamped by the protrusions and thus the flat cable 33 is locked. When the flat cable 33 is deformed according to the reciprocating movement of the scanner 40, a force is transmitted from the curved part 332 of the flat cable 33 to the locking part 52. Due to the force transmitted to the locking part 52, the slide member 50 slidably moves along the slide path 70.

The hook part 53 is formed at the center of the surface opposite to the surface on which the fitting part 56 is formed, that is, a position opposite to the fitting part 56 with the base part 51 therebetween. The hook part 53 is a columnar member and has a peripheral surface on which the curved part 332 of the flat cable 33 is hooked.

The insertion part 54 includes a columnar third wall part 541 and a columnar fourth wall part 542 which are disposed to face each other. The third wall part 541 and the fourth wall part 542 are juxtaposed with an interval of a length equal to or greater than the thickness of the flat cable 33 therebetween, and the flat cable 33 located on the other end side relative to the curved part 332 is inserted therebetween.

Here, since the fitting part 56 fitted into the groove of the slide path 70 is formed in a hemispherical shape, the slide member 50 is slidably movable along the slide path 70 and an orientation thereof in the direction of the bottom surface 31B of the housing 31 centered on the fitting part 56 is changeable. That is, due to a force transmitted from the curved part 332 of the flat cable 33 to the locking part 52 according to the reciprocating movement of the scanner 40, the slide member 50 slidably moves on the bottom surface 31B of the housing 31 and an orientation in the direction of the bottom surface 31B is changed.

Figure 6:
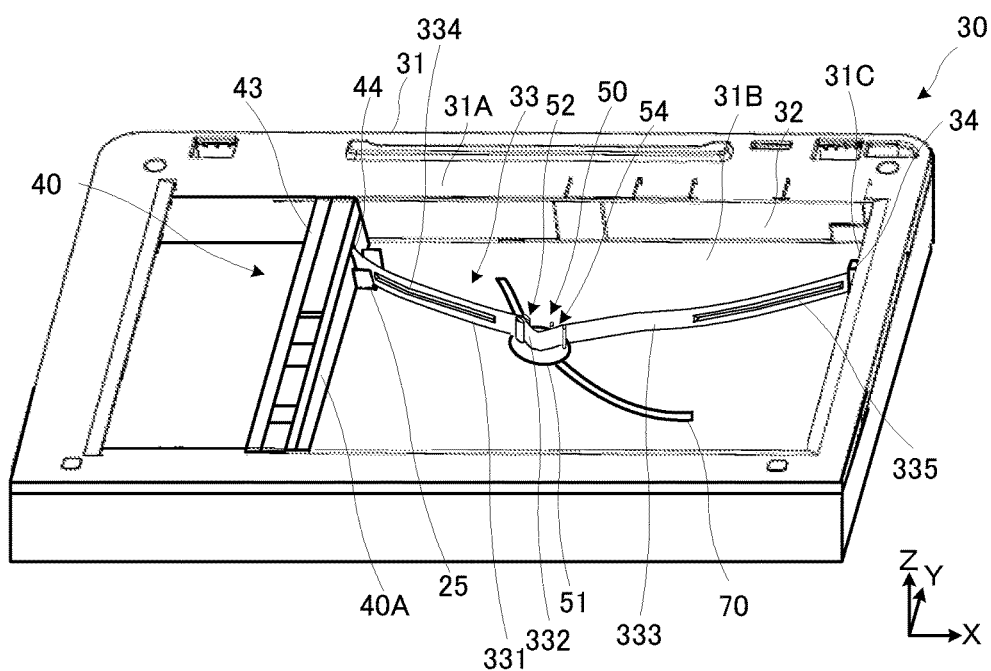
FIG. 6 is a diagram showing a state in which a scanner shown in FIG. 3 located at a home position is moved.

FIG. 6 is a diagram showing a state in which the scanner 40 shown in FIG. 3 located at the home position is moved to the side (the positive X direction in the drawing) on which the housing fixing part 34 is provided. As shown in the drawing, when the scanner 40 moves from the home position shown in FIG. 3 in the positive X direction in the drawing, the flat cable 33 moves in the positive X direction according to movement of the scanner 40 in the positive X direction. Since the flat cable 33 has a constant Young's modulus (degree of stiffness), during the above movement, a force in the positive X direction is transmitted from the curved part 332 of the flat cable 33 to the locking part 52. Due to the force, as shown in FIG. 6, the slide member 50 moves along the slide path 70 from the position shown in FIG. 3 to the side in the negative Y direction in the drawing and the side in the negative X direction in the drawing. In addition, due to the force in the positive X direction transmitted from the curved part 332 of the flat cable 33 to the locking part 52, the slide member 50 rotates around the fitting part 56 along the bottom surface 31B of the housing 31. Accordingly, the orientation of the slide member 50 is changed to the orientation shown in FIG. 6.

Figure 7A:
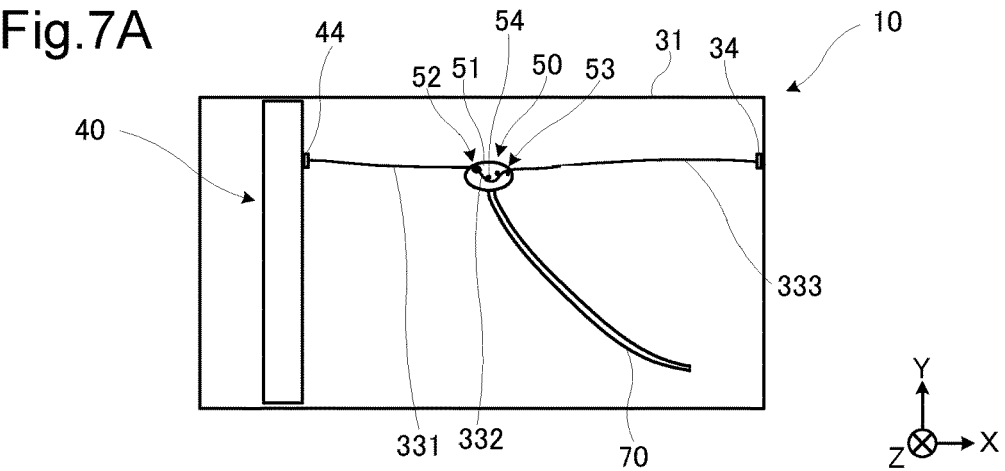
FIG. 7A is a diagram of the reading unit shown in FIG. 3 seen from above.
Figure 7B:
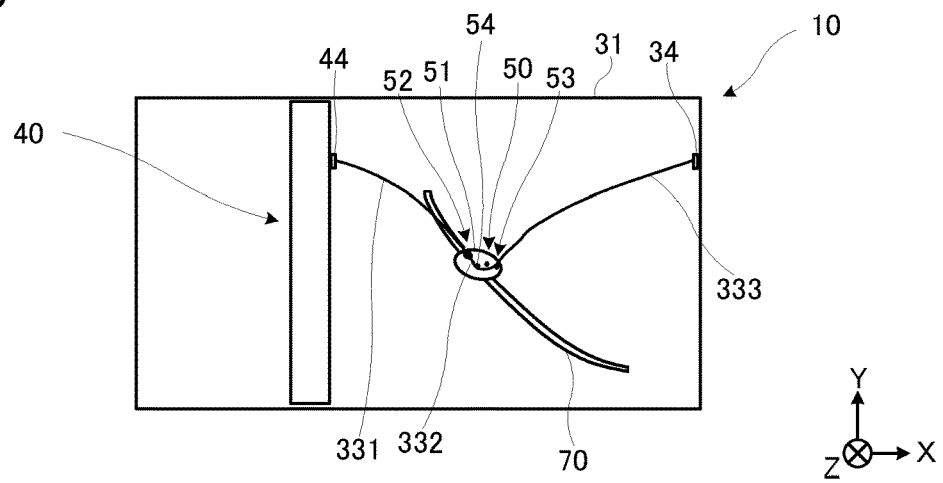
FIG. 7B is a diagram of the reading unit shown in FIG. 6 seen from above.
Figure 7C:
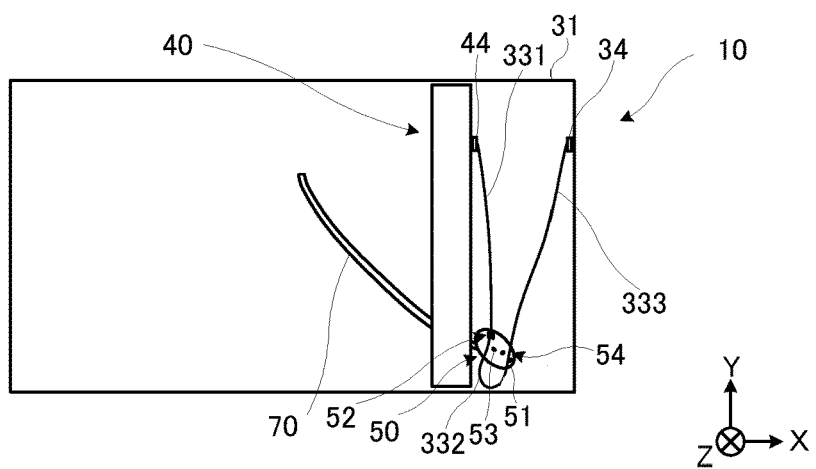
FIG. 7C is a diagram showing a state in which the scanner has moved from a position shown in FIG. 7B.

Further description will be provided with reference to FIG. 7A to FIG. 7C. FIG. 7A is a diagram of the drawing shown in FIG. 3 seen from above (the positive Z direction). FIG. 7B is a diagram of the drawing shown in FIG. 6 seen from above. In addition, FIG. 7C is a diagram showing a state in which the scanner 40 is further moved from the state shown in FIG. 7B to the side (the positive X direction in the drawing) on which the housing fixing part 34 is provided. As shown in FIG. 7C, when the scanner 40 is further moved from the position shown in FIG. 7B in the positive X direction in the drawing, the flat cable 33 moves in the positive X direction and a force in the positive X direction is transmitted from the curved part 332 of the flat cable 33 to the locking part 52. Due to the force, as shown in FIG. 7C, the slide member 50 moves along the slide path 70 and further moves from the position shown in FIG. 7B to the side in the negative Y direction in the drawing and the side in the negative X direction in the drawing. In addition, due to the force in the positive X direction transmitted from the curved part 332 of the flat cable 33 to the locking part 52, the slide member 50 further rotates around the fitting part 56 along the bottom surface 31B of the housing 31.

As above, as the scanner 40 moves, the position and orientation of the slide member 50 are changed. Accordingly, deformation (method of orienting and curving) in the housing 31 of the flat cable 33 is guided. For example, as in the state shown in FIG. 7C, when the scanner 40 approaches the housing fixing part 34, deformation of the flat cable 33 is guided so that the flat cable 33 greatly bulges and curves to the side in the negative Y direction in the drawing. Accordingly, even if the scanner 40 approaches the housing fixing part 34, the flat cable 33 does not come in contact with the housing 31.

When the slide member 50 described above is not provided, the flat cable 33 may be bent in an inappropriate direction in the housing 31 as the scanner 40 moves. For example, when the flat cable 33 shown in FIG. 3 and FIG. 6 bulges and curves to the side in the positive Y direction in the drawing, the flat cable 33 comes in contact with the side surface of the housing 31. In this case, there is a risk of the flat cable 33 becoming tangled and movement of the scanner 40 being hindered. In this regard, according to the image reading device 10 of Embodiment 1, since deformation of the flat cable 33 in the housing 31 can be guided in an appropriate direction, when the flat cable 33 comes in contact with the side surface of the housing 31, it is possible to avoid a situation in which movement of the scanner 40 is hindered.

Incidentally, a general flat cable may come in contact with the loading plate due to deformation according to reciprocating movement of the scanner. In particular, when the flat surface of a general flat cable comes in contact with the loading plate, there is a risk of the flat surface sticking to the loading plate and the loading plate becoming dirty.

On the other hand, in the present embodiment, it is possible to prevent the flat cable from coming in contact with the loading plate with a simple configuration.

Modified Example 1

Figure 8:
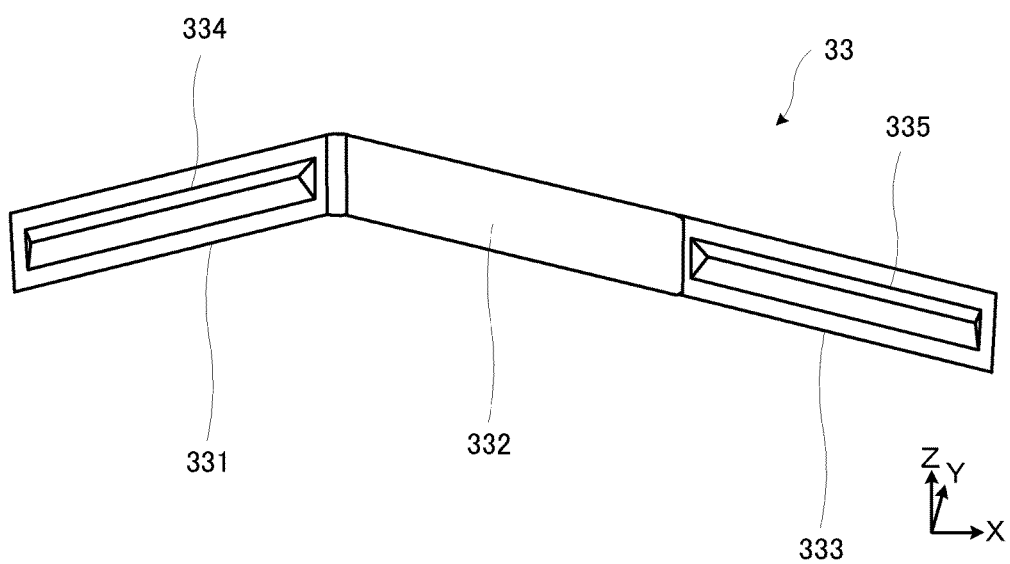
FIG. 8 is a diagram showing a detailed configuration of a flat cable shown in FIG. 3 and FIG. 6.

FIG. 8 is a diagram showing a detailed configuration of the flat cable 33 shown in FIG. 3 or FIG. 6. As shown in the drawing, on the flat cable 33, protrusions 334 and 335 in which a part of the flat surface protrudes in a direction orthogonal to the flat surface are formed. When the protrusions 334 and 335 are formed, the Young's modulus of the flat surface of the flat cable 33 with respect to the width direction increases, and the flat cable 33 can be arranged so that the width direction of the flat surface follows the direction orthogonal to the bottom surface of the loading plate 32.

The protrusions 334 and 335 are formed by deforming a resin film of the flat cable 33 using a mold or the like. In addition, a plurality of core wires included in the flat cable 33 are juxtaposed in the width direction (the Z direction in the drawing) of the flat surface at positions other than the protrusions 334 and 335. That is, core wires are juxtaposed on the upper and lower portions of the flat cable 33 in the width direction in FIG. 8, but no core wires are juxtaposed at the center.

In addition, the protrusion 334 is formed on the first extending part 331 of the flat cable 33, and the protrusion 335 is formed on an area that is a predetermined length or more away from the curved part 332 within the second extending part 333 of the flat cable 33. In other words, in an area that is less than a predetermined length away from the curved part 332 between the curved part 332 and the second extending part 333, no protrusion is formed and a reinforcement process of increasing the Young's modulus is not performed.

The protrusion 335 is not formed on the entire area of the second extending part 333, and the protrusion 335 is formed on only an area that is a predetermined length or more away from the curved part 332 within the second extending part 333. Therefore, when the scanner 40 is moved fully to the side (the positive X direction in the drawing) on which the housing fixing part 34 is provided, that is, even if the slide member 50 is moved to the end on the side (the positive X direction in the drawing) on which the housing fixing part 34 of the slide path 70 is provided, the protrusion 335 does not come in contact with the insertion part 54. Accordingly, it is possible to avoid a situation in which the protrusion 335 formed on the flat cable 33 comes in contact with the insertion part 54 of the slide member 50 and sliding movement of the slide member 50 is hindered.

Figure 9:
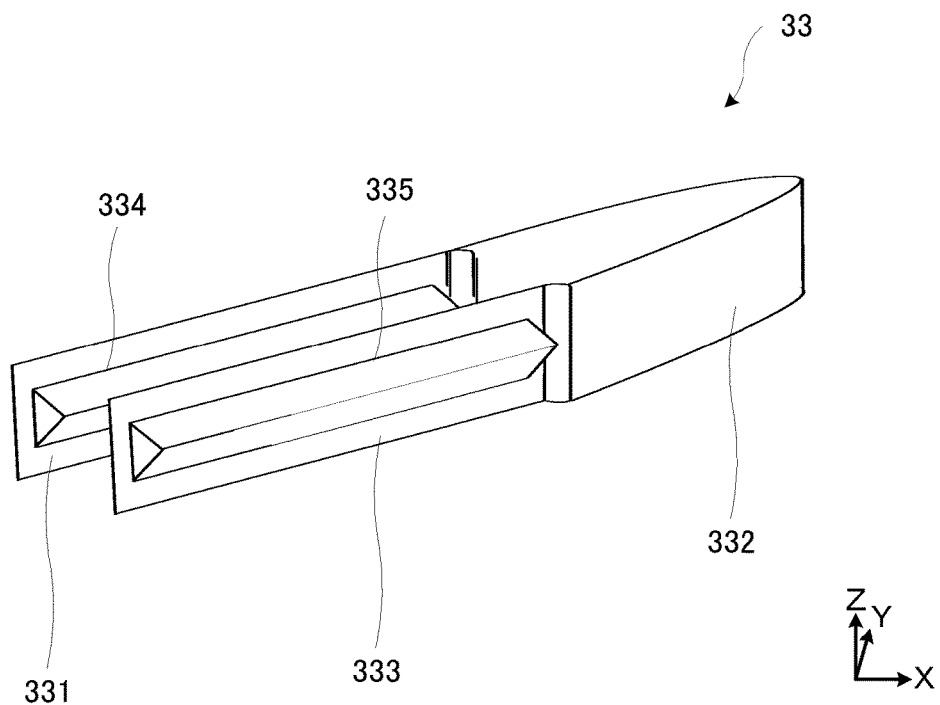
FIG. 9 is a diagram showing a modified example of the configuration of the flat cable.

In addition, FIG. 9 is a diagram showing a configuration of another modified example of the flat cable 33. As shown in the drawing, the protrusion 334 and the protrusion 335 may be provided so that directions of protruding from the flat cable 33 are the same while the curved part 332 is curved and the flat cable 33 is folded. Then, the protrusion 335 may be formed to be greater than the protrusion 334. Accordingly, while the curved part 332 is curved and the flat cable 33 is folded, the protrusion 334 is located in a recess formed on the side opposite to the protrusion 335, and the protrusion 334 and the protrusion 335 overlap. Accordingly, the flat cable 33 can be accommodated in a narrower area.

Figure 10:
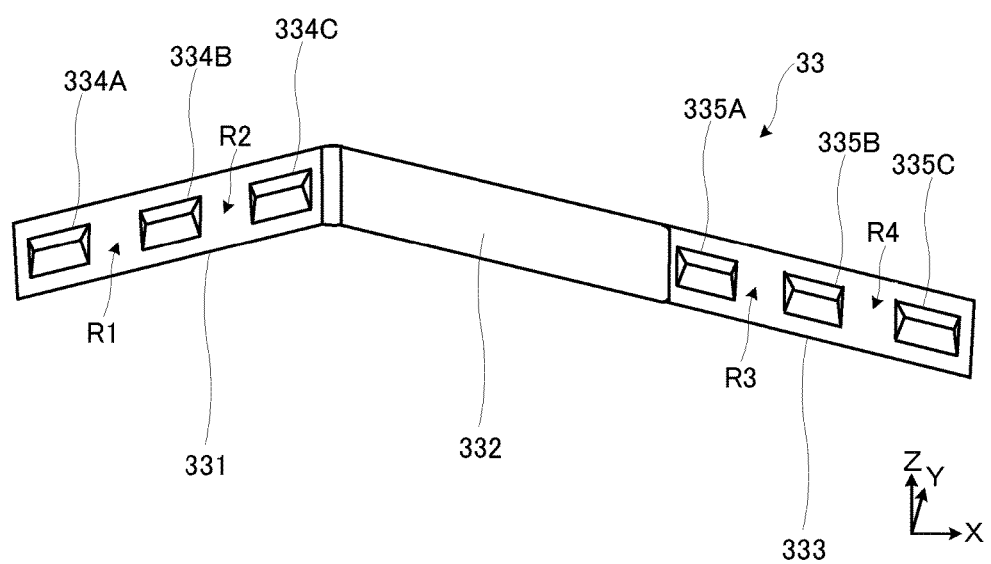
FIG. 10 is a diagram showing a modified example of the configuration of the flat cable.

FIG. 10 is a diagram showing a configuration of another modified example of the flat cable 33. As shown in the drawing, a plurality of protrusions 334A to 334C and 335A to 335C in which a part of the flat surface protrudes in a direction orthogonal to the flat surface may be juxtaposed in the longitudinal direction of the flat cable 33.

Accordingly, a reinforcement process of increasing the Young's modulus is not performed on an area R1 between the protrusion 334A and the protrusion 334B, an area R2 between the protrusion 334B and the protrusion 334C, an area R3 between the protrusion 335A and the protrusion 335B, and an area R4 between the protrusion 335B and the protrusion 335C. Thus, since curving is possible in these areas R1 to R4, it is possible to deform the flat cable 33 in a more flexible manner.

In addition, the plurality of core wires included in the flat cable 33 are juxtaposed in the width direction (the Z direction in the drawing) of the flat surface at positions other than the protrusions 334A to 334C and 335A to 335C. That is, in FIG. 10, in addition to the upper and lower portions in the width direction of the flat cable 33, the core wires are juxtaposed in the areas R1 to R4.

Modified Example 2

Figure 11A:
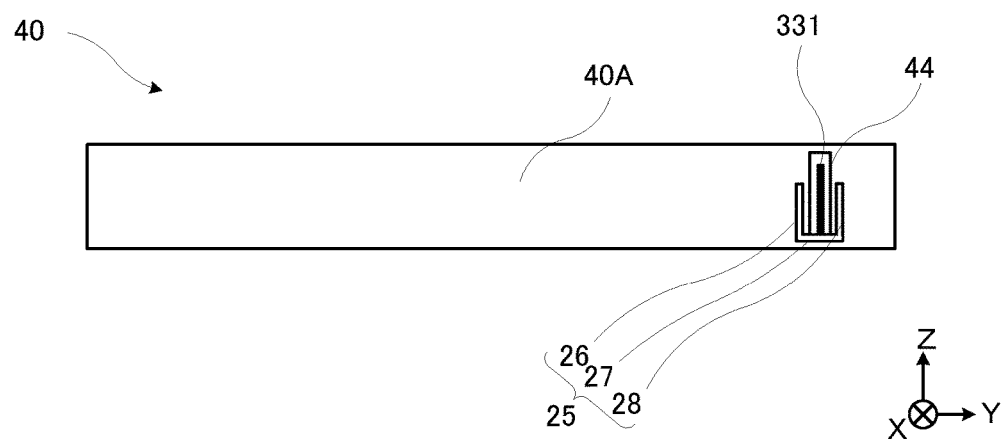
FIG. 11A is a diagram of the scanner shown in FIG. 3 and FIG. 6 seen from a side on a side surface on which a cable port is provided.
Figure 11B:
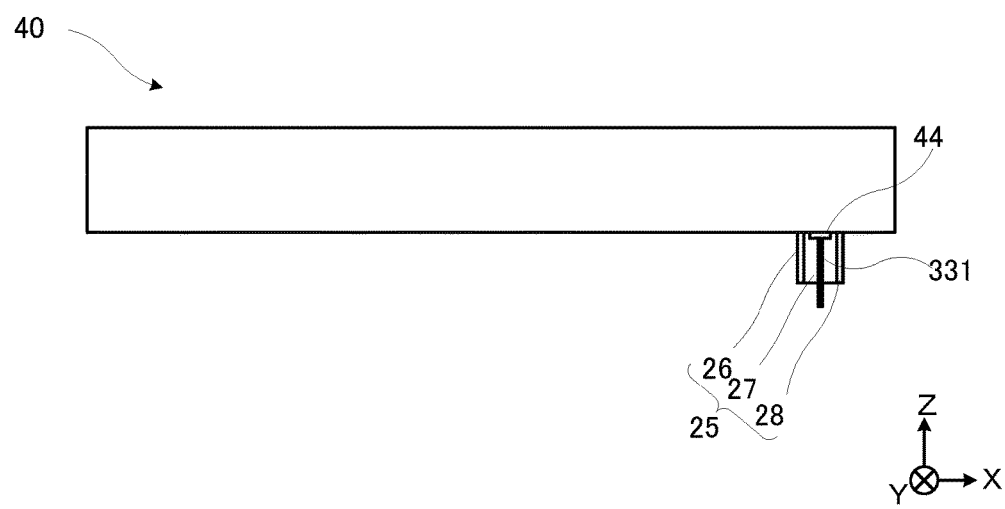
FIG. 11B is a diagram of the scanner shown in FIG. 3 and FIG. 6 seen from above.

FIG. 11A is a diagram of the scanner 40 shown in FIG. 3 and FIG. 6 seen from the side on the side surface 40A on which the cable port 44 is provided. FIG. 11B is a diagram of the scanner 40 shown in FIG. 3 or FIG. 6 seen from above. As shown in the drawings, on the side surface 40A of the scanner 40 on which the cable port 44 is provided, a holding member 25 that protrudes from a position below (the negative Z direction in the drawing) the cable port 44 in the sub-scanning direction is provided. The holding member 25 includes a bottom wall part 27, and a first wall part 26 and a second wall part 28 that protrude from both ends of the bottom wall part 27 in the main scanning direction upward (the positive Z direction in the drawing). The first wall part 26 and the second wall part 28 are juxtaposed with an interval of a length equal to or greater than the thickness of the flat cable 33 therebetween, and the first extending part 331 of the flat cable 33 connected to the cable port 44 is inserted therebetween. In this case, the side surface on the side (side in the negative Z direction in the drawing) of the bottom surface 31B of the housing 31 of the first extending part 331 abuts the bottom wall part 27 of the holding member 25. In this manner, the first extending part 331 is held from the side on the bottom surface 31B of the housing 31 by the first wall part 26, the second wall part 28, and the bottom wall part 27. Accordingly, it is possible to avoid a situation in which the flat surface in the width direction is bent in the direction orthogonal to the bottom surface of the loading plate 32 and the flat cable 33 comes in contact with the bottom surface 31B of the housing 31.

Modified Example 3

Figure 12:
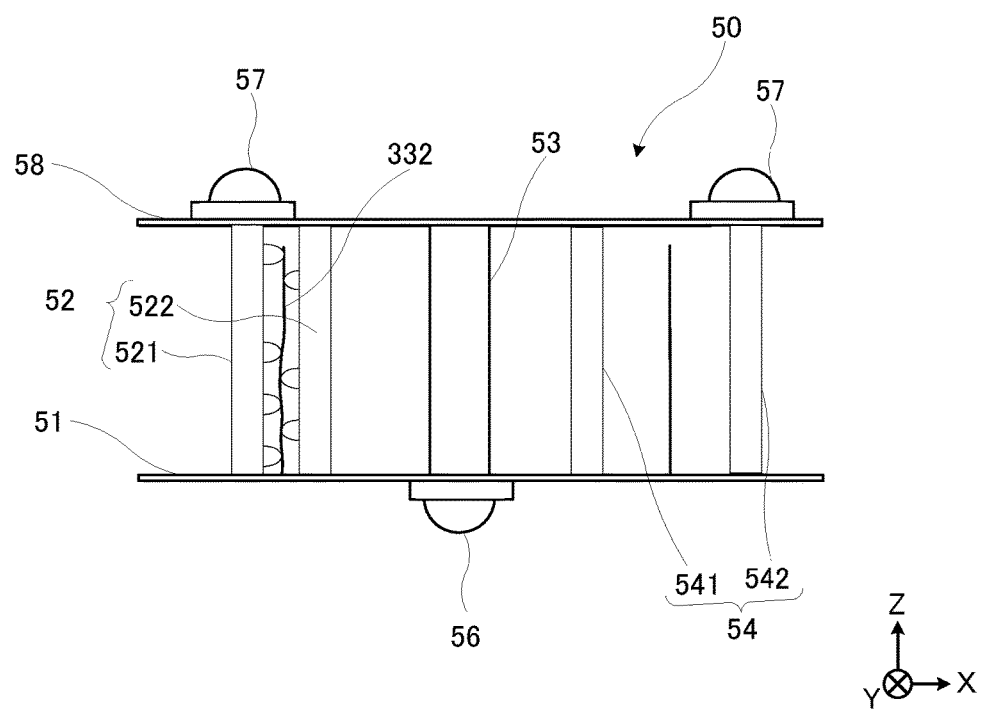
FIG. 12 is a diagram showing a configuration of a slide member of an image reading device according to Modified Example 3.

FIG. 12 is a diagram showing a configuration of the slide member 50 according to Modified Example 3. In the slide member 50 according to Modified Example 3, an upper wall part 58 is provided above (the positive Z direction in the drawing) the base part 51, the locking part 52, the hook part 53, and the insertion part 54 members being provided between the base part 51 and the upper wall part 58. Further, on a surface that faces the bottom surface of the loading plate 32 of the upper wall part 58, a plurality of hemispherical abutment members 57 that protrude to the side of the bottom surface of the loading plate 32 are formed. The slide member 50 slidably moves in the housing 31 while the plurality of abutment members 57 abut the bottom surface of the loading plate 32 and the fitting part 56 is fitted into the groove of the slide path 70. When the abutment member 57 that abuts the bottom surface of the loading plate 32 is provided, it is possible to slidably move the slide member 50 in a more stable orientation.

Modified Example 4

Figure 13A:
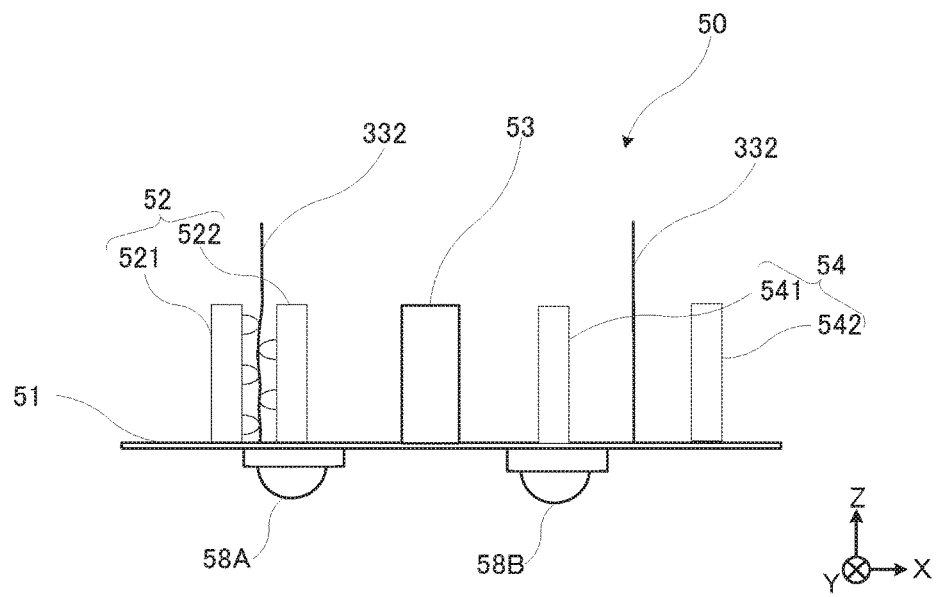
FIG. 13A is a diagram showing a configuration of a slide member of an image reading device according to Modified Example 4.
Figure 13B:
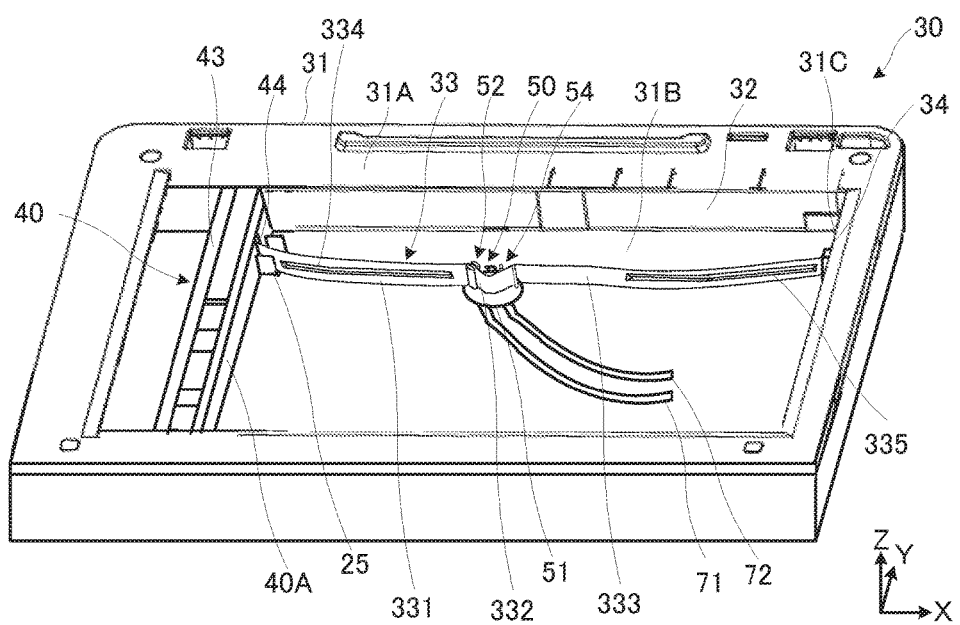
FIG. 13B is a diagram showing a configuration of a reading unit of the image reading device according to Modified Example 4.

FIG. 13A is a diagram showing a configuration of the slide member 50 according to Modified Example 4. As shown in the drawing, in the slide member 50 according to Modified Example 4, on a surface that faces the bottom surface 31B of the housing 31 of the base part 51, two fitting parts 58A and 58B that protrude to the side (the negative Z direction in the drawing) of the bottom surface 31B of the housing 31 are formed. In addition, FIG. 13B is a diagram showing a configuration of the reading unit 30 according to Modified Example 4. In the reading unit 30 according to Modified Example 4, the slide paths 71 and 72 that are juxtaposed are formed on the bottom surface 31B of the housing 31. Both the slide paths 71 and 72 are formed so as to describe an arc toward the side in the negative Y direction in the drawing and the side in the negative X direction in the drawing. The fitting part 58A of the slide member 50 fits into the slide path 71, and the fitting part 58B of the slide member 50 fits into the slide path 72.

Due to a force that is transmitted from the curved part 332 of the flat cable 33 to the locking part 52 according to reciprocating movement of the scanner 40, an orientation in the direction along the bottom surface 31B of the slide member 50 is changed. However, as above, when the slide member 50 is slidably moved along the two slide paths 71 and 72, it is possible to restrict the orientation of the slide member 50 to be within a certain range. For example, a situation in which the slide member 50 rotates once or more due to the force transmitted from the flat cable 33 and the flat cable 33 becomes tangled cannot occur. In addition, it is possible to slidably move the slide member 50 in a more stable orientation.

Modified Example 5

Figure 14A:
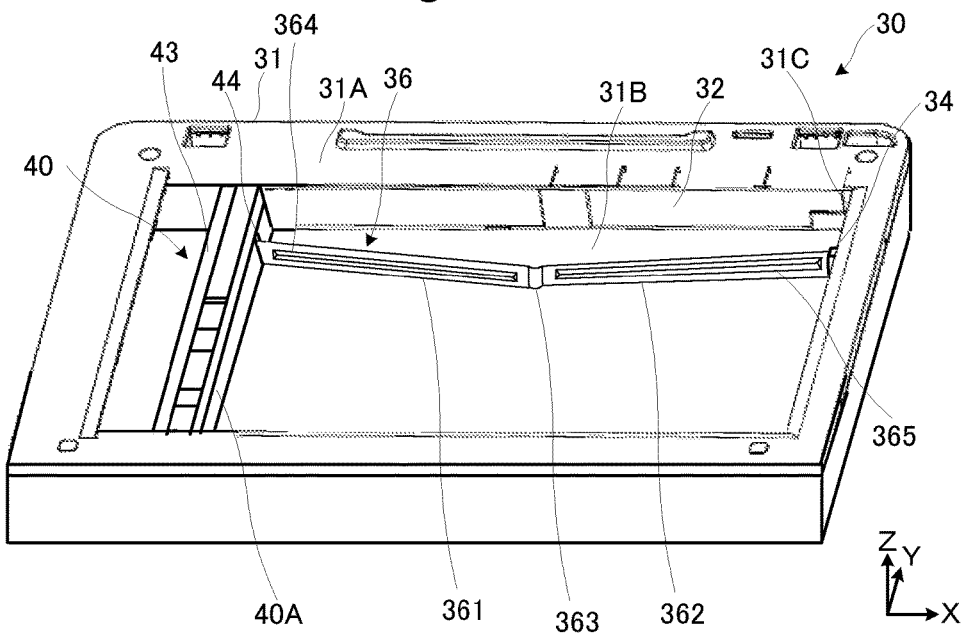
FIG. 14A is a diagram showing a configuration of a reading unit of an image reading device according to Modified Example 5.

FIG. 14A is a diagram showing a configuration of the reading unit 30 according to Modified Example 5. As shown in the drawing, in the reading unit 30 according to Modified Example 5, the shape of the flat cable is different from that in Embodiment 1. A flat cable 36 of the reading unit 30 according to Modified Example 5 includes a first extending part 361 that extends from one end connected to the cable port 44, a second extending part 362 that extends from the other end fixed by the housing fixing part 34, and a curved part 363 that connects the first extending part 361 and the second extending part 362. Further, a protrusion 364 is formed on the first extending part 361 and a protrusion 365 is formed on the second extending part 362 within the flat cable 36. On the other hand, on the curved part 363, no protrusion is formed and no reinforcement process of increasing the Young's modulus is performed.

Figure 14B:
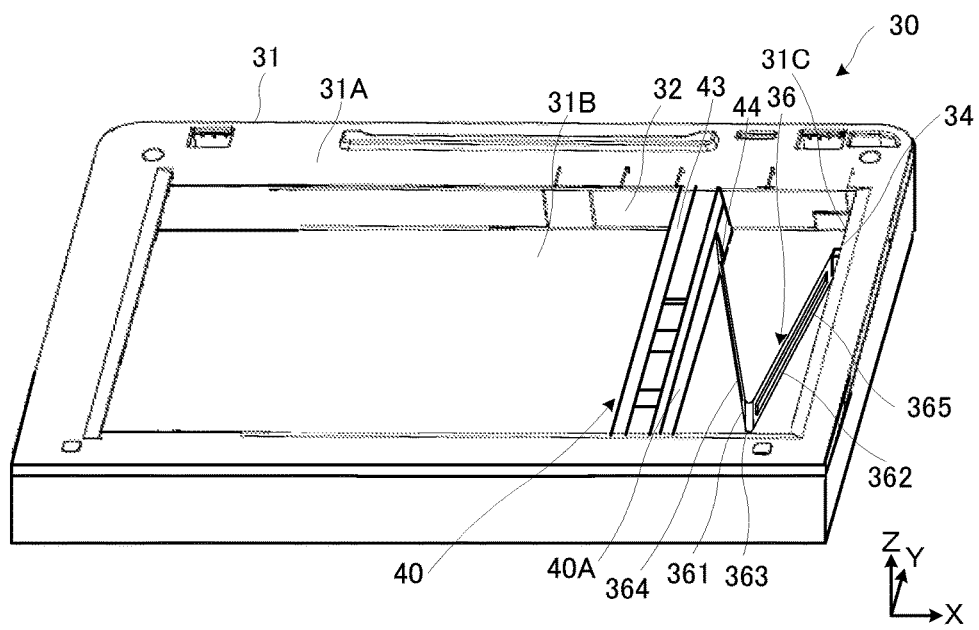
FIG. 14B is a diagram showing a state in which the scanner has moved from the state shown in FIG. 14A.

As shown in FIG. 14A, since the area of the curved part 363 on which no reinforcement process is performed and which can be curved is narrower than that in Embodiment 1, when the scanner 40 moves in the positive X direction in the drawing, as shown in FIG. 14B, the flat cable 36 is deformed into a substantially V shape. Therefore, it is possible to avoid a situation in which the flat cable 36 describes a large circular arc and curves in the negative Y direction in the drawing, and a part of the flat cable 33 comes in contact with the side surface of the housing 31.

Here, while a case in which a reinforcement process of increasing the Young's modulus is performed by forming the protrusions 364 and 365 has been described above, the present disclosure is not necessarily limited to this case. For example, the Young's modulus may be improved by attaching a sheet member (reinforcing member) having a certain elasticity to the first extending part 361 and the second extending part 362 within the flat cable 36.

Modified Example 6

Figure 15:
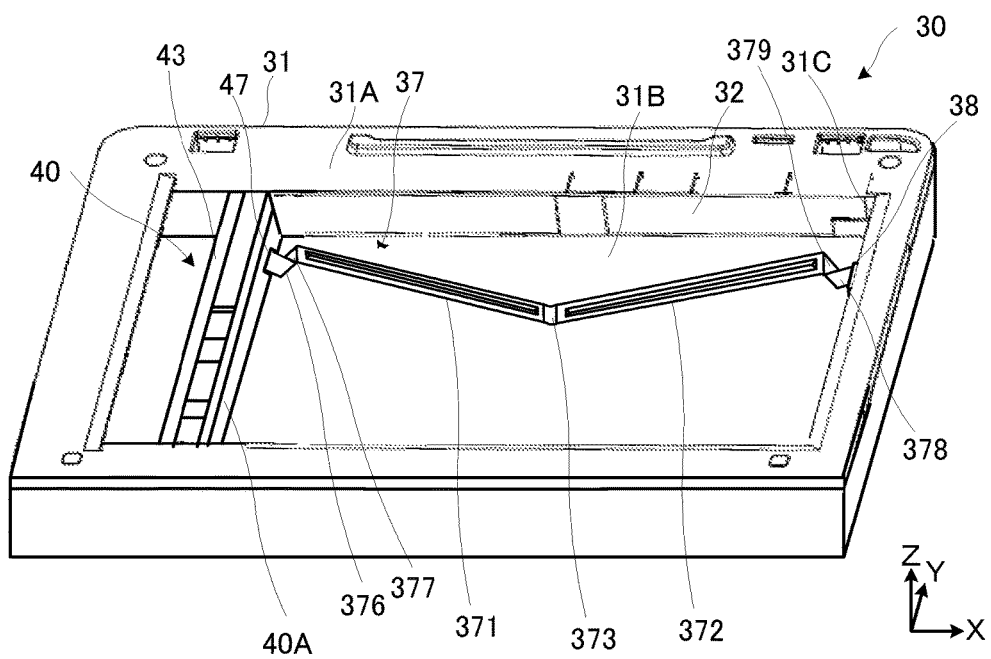
FIG. 15 is a diagram showing a configuration of a reading unit of an image reading device according to Modified Example 6.

FIG. 15 is a diagram showing a configuration of the reading unit 30 according to Modified Example 6. As shown in the drawing, in the reading unit 30 according to Modified Example 6, a cable port 47 that extends in the main scanning direction is formed on the side surface 40A of the scanner 40. In addition, among side surfaces of the housing 31, on the side surface 31C located at an end (the positive X direction in the drawing) opposite to the home position for the scanner 40 in the sub-scanning direction, a housing fixing part 38 (frame fixing part) fixing the other end of a flat cable 37 to the housing 31 so that the width direction of the flat surface follows the main scanning direction is provided.

On one end and the other end of the flat cable 37, the width direction of the flat surface follows the main scanning direction by the cable port 47 and the housing fixing part 38. On the other hand, at the center of the flat cable 37, in order to prevent the flat cable 37 from coming in contact with the loading plate 32, it is preferable that the width direction of the flat surface follow the direction orthogonal to the bottom surface of the loading plate 32. Therefore, in the reading unit 30 according to Modified Example 6, the flat cable 37 has a shape shown in FIG. 16C. That is, in the flat cable 37, on an end 376 including one end connected to the cable port 47, a first bent part 377 that is bent so that the width direction of the flat surface follows the direction orthogonal to the bottom surface of the loading plate 32 from the direction following the main scanning direction is formed. In addition, in the flat cable 37, on an end 378 including the other end fixed by the housing fixing part 38, a second bent part 379 that is bent so that the width direction of the flat surface follows the direction orthogonal to the bottom surface of the loading plate 32 from the direction following the main scanning direction is formed.

Figure 16A:
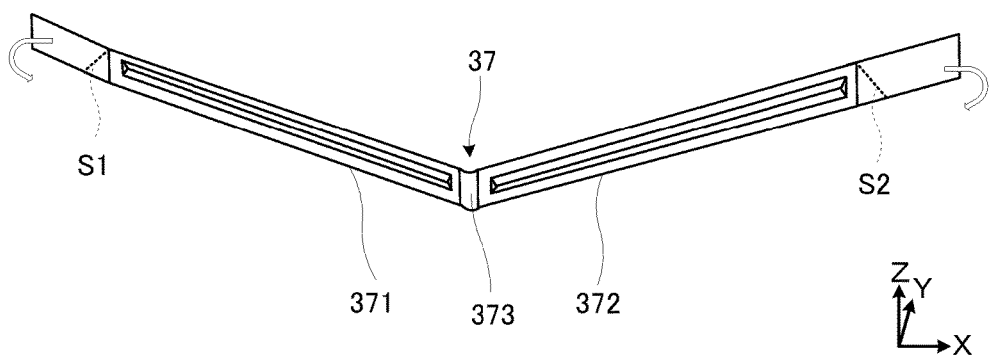
FIG. 16A to FIG. 16C are diagrams showing a configuration of a flat cable of an image reading device according to Modified Example 6.
Figure 16B:
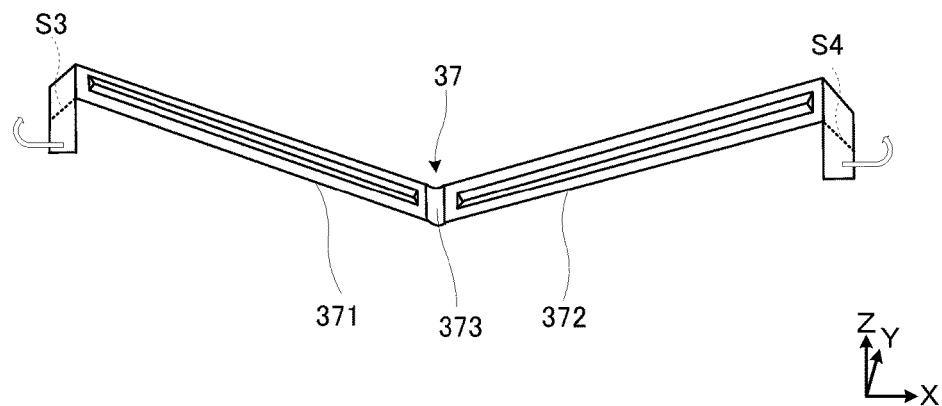
Figure 16C:
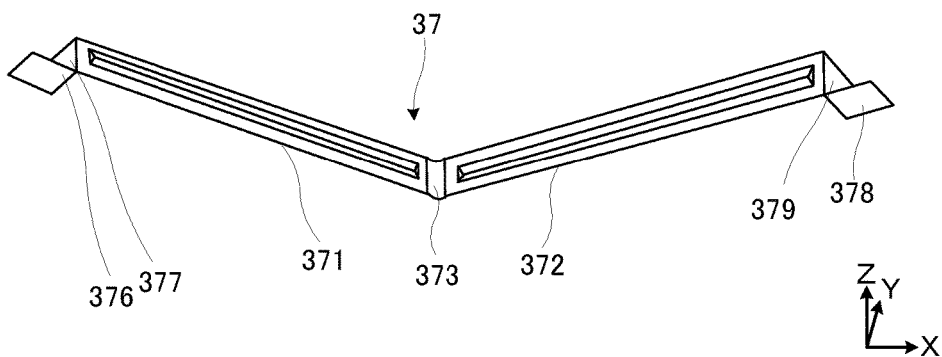

The first bent part 377 is formed by bending an end of a first extending part 371 in the arrow direction along a dotted line S1 shown in FIG. 16A, and then performing bending in the arrow direction along a dotted line S3 shown in FIG. 16B. In addition, the second bent part 379 is formed by bending an end of a second extending part 372 connected to the first extending part 371 through a curved part 373 in the arrow direction along a dotted line S2 shown in FIG. 16A, and then performing bending in the arrow direction along a dotted line S4 shown in FIG. 16B.

In this manner, according to the reading unit 30 according to Modified Example 6, in a configuration of the cable port and the housing fixing part that extend in the main scanning direction which is used in a general image reading device, it is possible to prevent the flat cable 37 from coming in contact with the loading plate 32.

Modified Example 7

Figure 17:
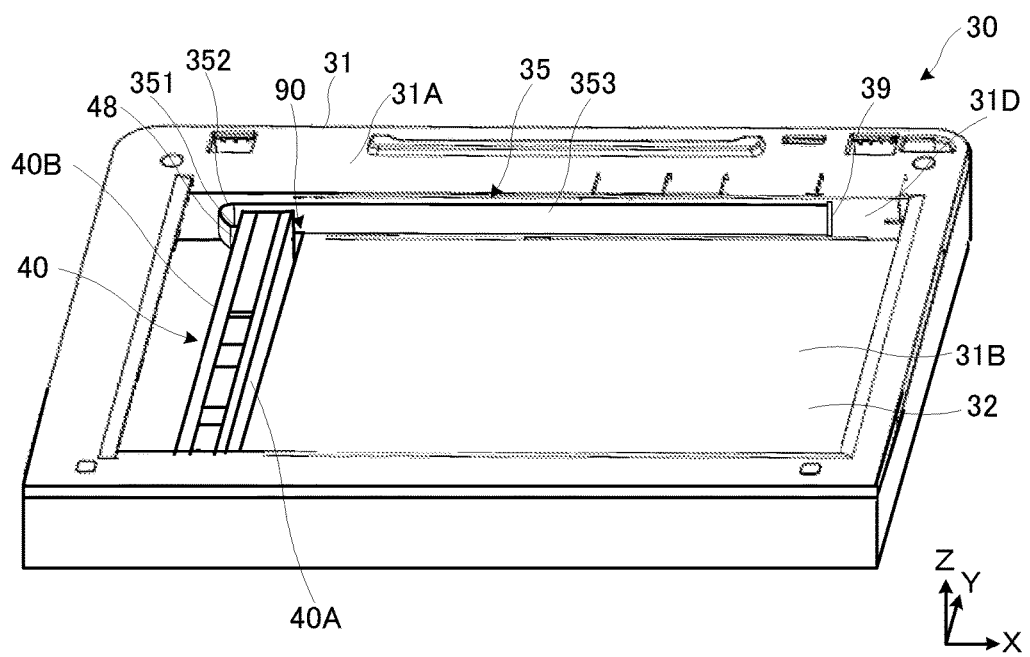
FIG. 17 is a diagram showing a configuration of a reading unit of an image reading device according to Modified Example 7.

FIG. 17 is a diagram showing a configuration of the reading unit 30 according to Modified Example 7. As shown in the drawing, in the reading unit 30 according to Modified Example 7, on an end on one side (the positive Y direction in the drawing) in the main scanning direction on a side surface 40B on the side in the negative X direction in the drawing of the scanner 40, a cable port 48 which extends in the direction orthogonal to the bottom surface of the loading plate 32 and to which one end of a flat cable 35 is connected is formed. In addition, a housing fixing part 39 is provided on a side surface 31D of the housing 31, and the other end of the flat cable 35 is fixed to the housing 31 by the housing fixing part 39. According to the cable port 48 and the housing fixing part 39, the flat cable 35 extends in the housing 31 so that the width direction of the flat surface follows the direction orthogonal to the bottom surface of the loading plate 32. Specifically, the flat cable 35 forms a first extending part 351 that extends from one end to one side (side in the negative X direction in the drawing) in the sub-scanning direction, a curved part 352 that is continuous with the first extending part 351 and folded back from one side in the sub-scanning direction to the other side (the positive X direction in the drawing) on the opposite side, and a second extending part 353 which is continuous with the curved part 352 and extends to the other side in the sub-scanning direction and in which the other end is fixed to the housing fixing part 39.

Figure 18:
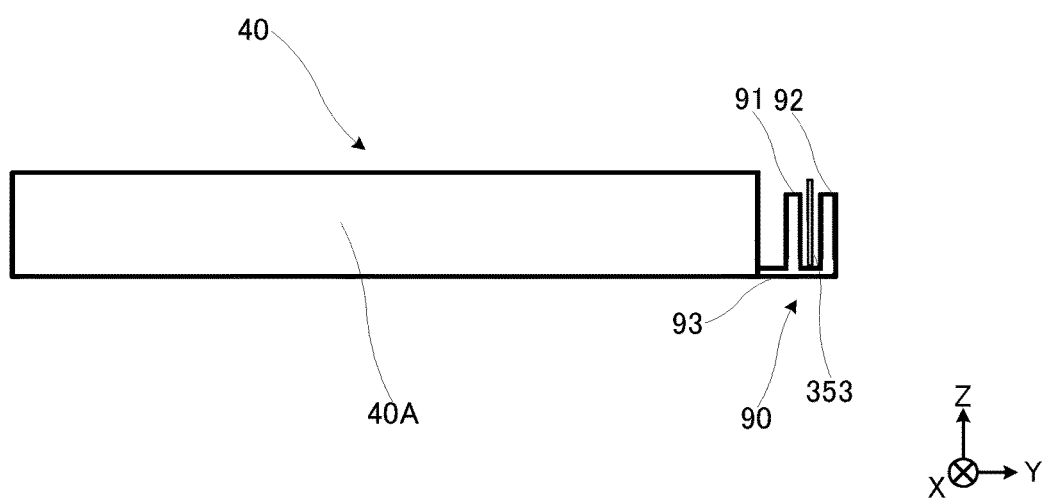
FIG. 18 is a diagram of a scanner of the image reading device according to Modified Example 7 seen from the side.

Here, on one side (the positive Y direction in the drawing) of the scanner 40 in the main scanning direction, a holding member 90 holding a part of the second extending part 353 of the flat cable 35 from the side on the bottom surface 31B of the housing 31 is provided. The holding member 90 is fixed to the side surface of the scanner 40 and reciprocates in the housing 31 together with the scanner 40. FIG. 18 is a side view of the scanner 40 seen from the side in the positive X direction. As shown in the drawing, the holding member 90 includes a bottom wall part 93, and a first wall part 91 and a second wall part 92 which protrude from the bottom wall part 93 to the side of the bottom surface of the loading plate 32. The first wall part 91 and the second wall part 92 are juxtaposed with an interval of a length equal to or greater than the thickness of the flat cable 35 therebetween, and the second extending part 353 of the flat cable 35 is inserted therebetween. In this case, the side surface on the side (a side in the negative Z direction in the drawing) of the bottom surface 31B of the housing 31 of the second extending part 353 abuts the bottom wall part 93 of the holding member 90. In this manner, the second extending part 353 is held from the side on the bottom surface 31B of the housing 31 by the first wall part 91, the second wall part 92, and the bottom wall part 93. Accordingly, it is possible to avoid a situation in which the flat surface in the width direction is bent in the direction orthogonal to the bottom surface of the loading plate 32 and the flat cable 35 comes in contact with the bottom surface 31B of the housing 31.

Figure 19A:
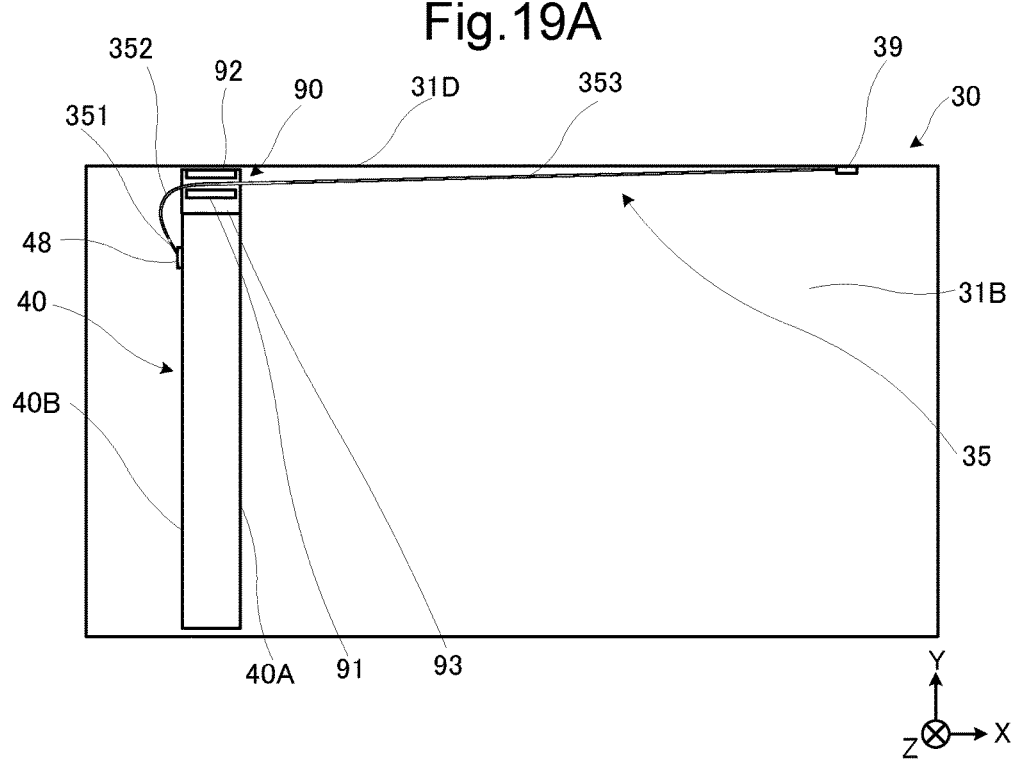
FIG. 19A and FIG. 19B are diagrams of the scanner of the image reading device according to Modified Example 7 seen from above.
Figure 19B:
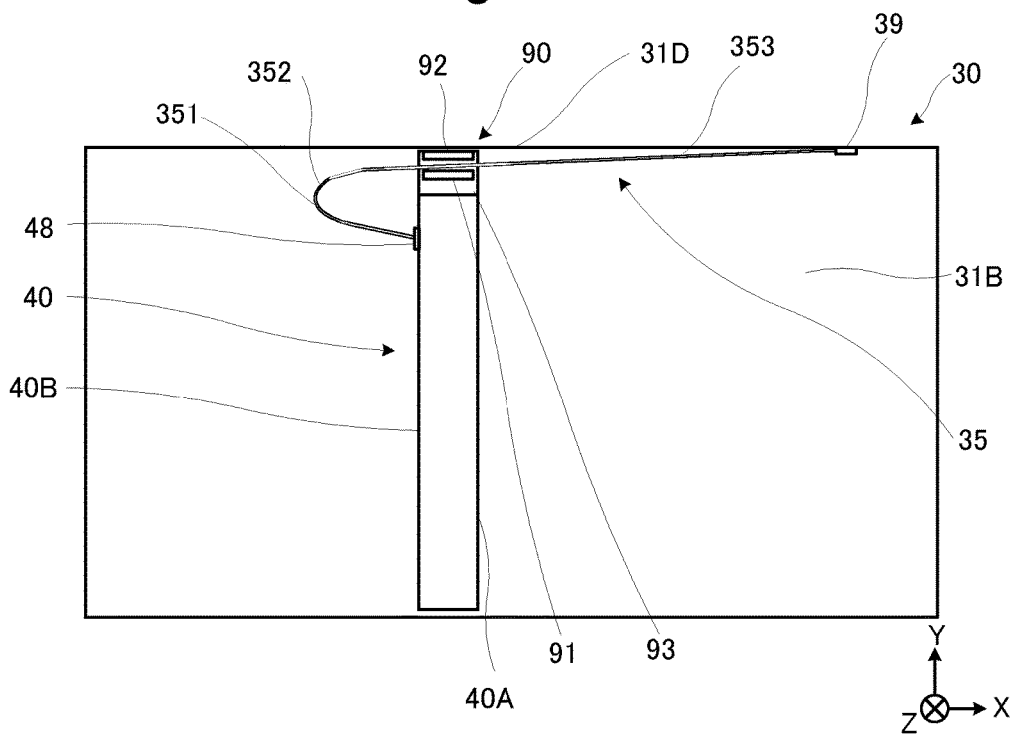

In addition, the holding member 90 also has a function of guiding deformation of the flat cable 35. FIG. 19A shows the reading unit 30 when the scanner 40 is located at the home position. From this state, when the scanner 40 moves in the positive X direction in the drawing, the flat cable 35 is deformed as shown in FIG. 19B. Since the second extending part 353 is inserted between the first wall part 91 and the second wall part 92 of the holding member 90, it is difficult for the flat cable 35 to come into contact with the side surface 31D of the housing 31. When no holding member 90 is provided, since the flat cable 35 is deformed while the flat cable 35 is in contact with the side surface 31D of the housing 31, a frictional force is generated between the side surface 31D of the housing 31 and the flat cable 35, and there is a risk of reciprocating movement of the scanner 40 being hindered due to the frictional force. In this regard, according to the reading unit 30 of Modified Example 7, since it is difficult for the flat cable 35 to come into contact with the side surface 31D of the housing 31 and the above frictional force is not generated between the side surface 31D of the housing 31 and the flat cable 35, the reciprocating movement of the scanner 40 is not hindered.

In addition, as described above, the holding member 90 is fixed to the side surface of the scanner 40 and reciprocates in the housing 31 together with the scanner 40. However, the reciprocating range is a range below the loading plate 32 (the negative Z direction in the drawing) in the housing 31. In other words, the holding member 90 is provided so that it is not located at a position below the upper surface 31A in the housing 31. Accordingly, the holding member 90 can be observed through the loading plate 32 without being obstructed by the upper surface 31A of the housing 31 from above (the positive Z direction in the drawing).

Here, when the flat cable 35 comes off from the holding member 90, maintenance is necessary. In this regard, as above, since the holding member 90 is provided at a position at which observation is possible from above, the user easily recognizes a case in which the flat cable 35 comes off from the holding member 90.

Embodiment 2

Figure 20:
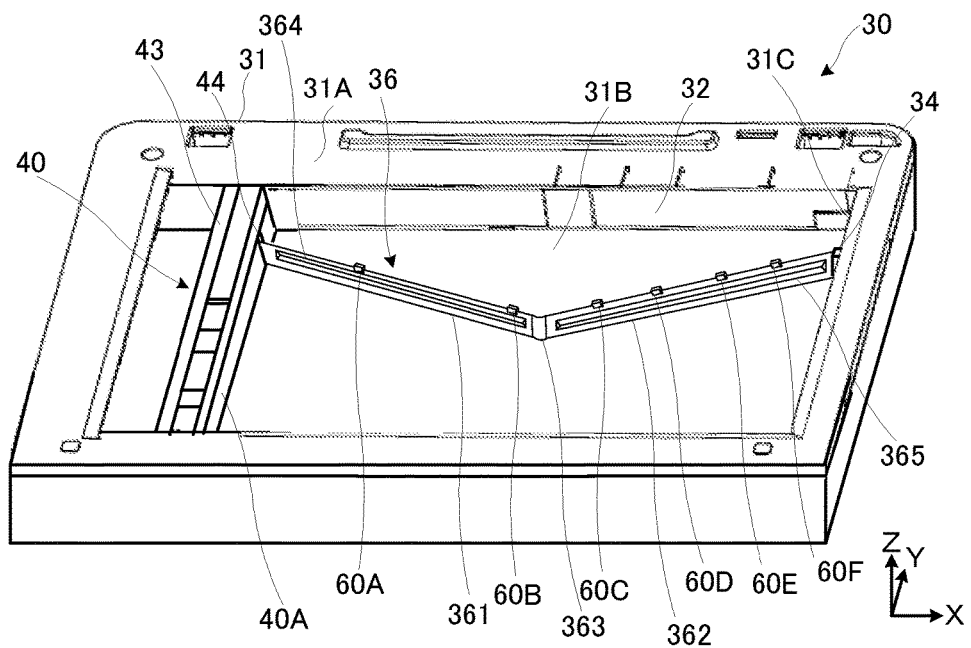
FIG. 20 is a diagram showing a configuration of a reading unit of an image reading device according to Embodiment 2.

FIG. 20 is a diagram showing a configuration of the reading unit 30 according to Embodiment 2. In addition, FIG. 21 and FIG. 22 are diagrams showing a configuration of the flat cable 36 according to Embodiment 2.

Figure 21:
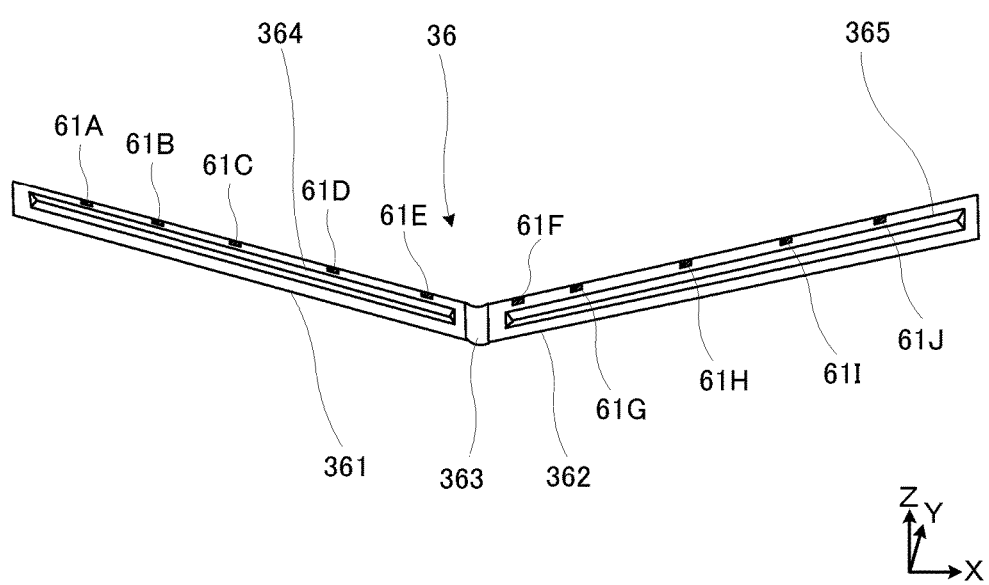
FIG. 21 is a diagram showing a configuration of a flat cable of the image reading device according to Embodiment 2.
Figure 22:
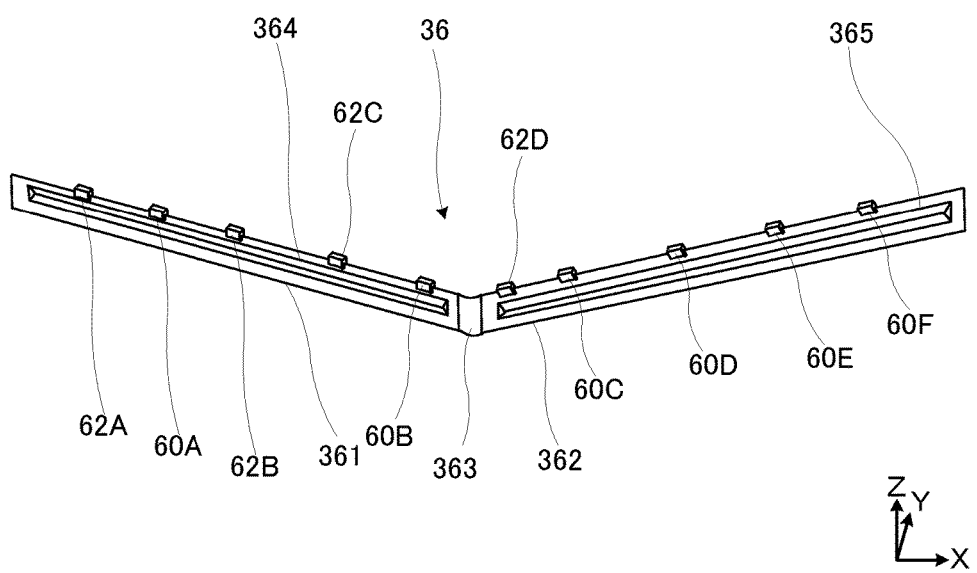
FIG. 22 is a diagram showing a configuration of the flat cable of the image reading device according to Embodiment 2.

As shown in FIG. 21, in the reading unit 30 according to Embodiment 2, on a side opposite to the bottom surface of the loading plate 32 of the flat cable 36, a plurality of cutout parts 61A to 61J in which a part of a coating of the flat cable 36 is cut are formed. Some core wires of the plurality of core wires included in the flat cable 36 are exposed by the cutout parts 61A to 61J. Thus, as shown in FIG. 22, in some cutout parts among the cutout parts 61A to 61J, a plurality of document detection sensors 60A to 60F whose detection directions are toward the side on the bottom surface of the loading plate 32 are provided. Specifically, the document detection sensors 60A to 60F are provided on the cutout parts 61B, 61E, 61G, 61H, 61I, and 61J among the cutout parts 61A to 61J. On the other hand, protective covers 62A to 62D are provided, respectively, on the cutout parts 61A, 61C, 61D, and 61F in which the document detection sensors 60A to 60F are not provided. The protective covers 62A to 62D are made of a resin having an insulation property and have a function of protecting core wires exposed from cutout parts.

Although details will be described below, the size of documents which can be detected differs depending on the positions of the document detection sensors 60A to 60F. In addition, the size of the document to be detected differs depending on the type of the image reading device. Therefore, when the image reading device 10 is produced, it is necessary to change positions at which the document detection sensors 60A to 60F are disposed according to the size of the document to be detected. In this regard, according to the above configuration, among the cutout parts 61A to 61J formed in the flat cable 36, the document detection sensor 60 is provided in a cutout part located at a desired position, and the protective cover 62 can be provided in cutout parts located at positions other than the desired position. Accordingly, without providing a different flat cable 36 for each type of image reading device, the document detection sensor 60 is provided at a desired position, and it is possible to detect the size of a document with a desired size. Here, when all of the document detection sensors 60A to 60F have the same configuration and are not particularly distinguished, they will be described below as a document detection sensor 60 without "A" or "F."

The document detection sensor 60 is a so-called reflection type sensor and includes a light emitting element and a light receiving element. The light emitting element is, for example, an infrared light emitting diode that emits infrared light, is disposed so that the main emission direction faces the loading plate 32, and emits infrared light toward the document loaded on the loading plate 32. In addition, the light receiving element is a light receiving element such as a photodiode and a phototransistor, is disposed so that the main light receiving direction faces the loading plate 32, and receives infrared light reflected at the document stacked on the loading plate 32 or the loading plate 32.

The document detection sensor 60 is electrically connected to any core wire among the plurality of core wires included in the flat cable 36 in the cutout parts 61A to 61J. A detection signal output from the document detection sensor 60 is transmitted to the control unit 100 through the core wire included in the flat cable 36. The detection signal output from the document detection sensor 60 is a signal indicating an intensity of infrared light received by light receiving element. When the intensity of infrared light indicated by the detection signal is a predetermined intensity or more, the document size detection unit 102 of the control unit 100 detects that a document is present on the document detection sensor 60 and infrared light emitted from the light emitting element has been reflected at the document. Then, the document size detection unit 102 detects whether there is a document at each of the document detection sensors 60 and determines the size of the document loaded on the loading plate 32 on the basis of the detection signals output from the plurality of document detection sensor 60.

Figure 23:
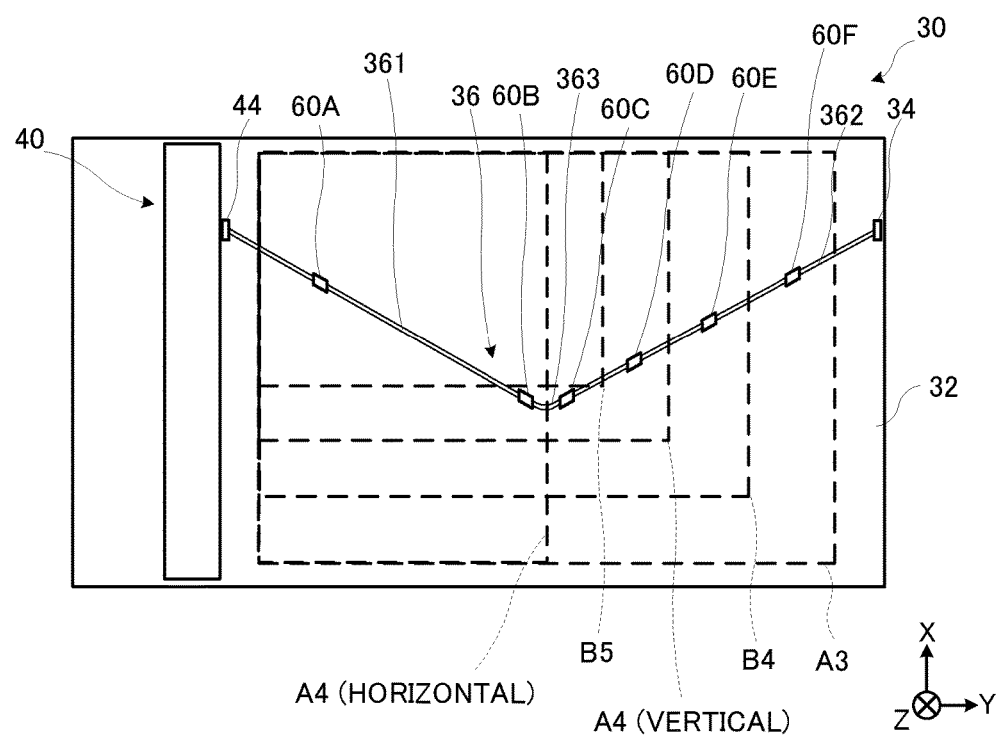
FIG. 23 is a diagram of the reading unit when a scanner is located at a home position in the image reading device according to Embodiment 2 seen from above.

The document detection sensors 60A to 60F are provided in the flat cable 36 so that they are located below a predetermined position on the loading plate 32. FIG. 23 is a diagram of the reading unit 30 when the scanner 40 is located at the home position seen from above. In the drawing, the dotted line indicates the size of each document loaded on the loading plate 32. When the scanner 40 is located at the home position, the document size detection unit 102 determines the size of the document loaded on the loading plate 32 on the basis of detection signals output from the plurality of document detection sensors 60.

Figure 24:
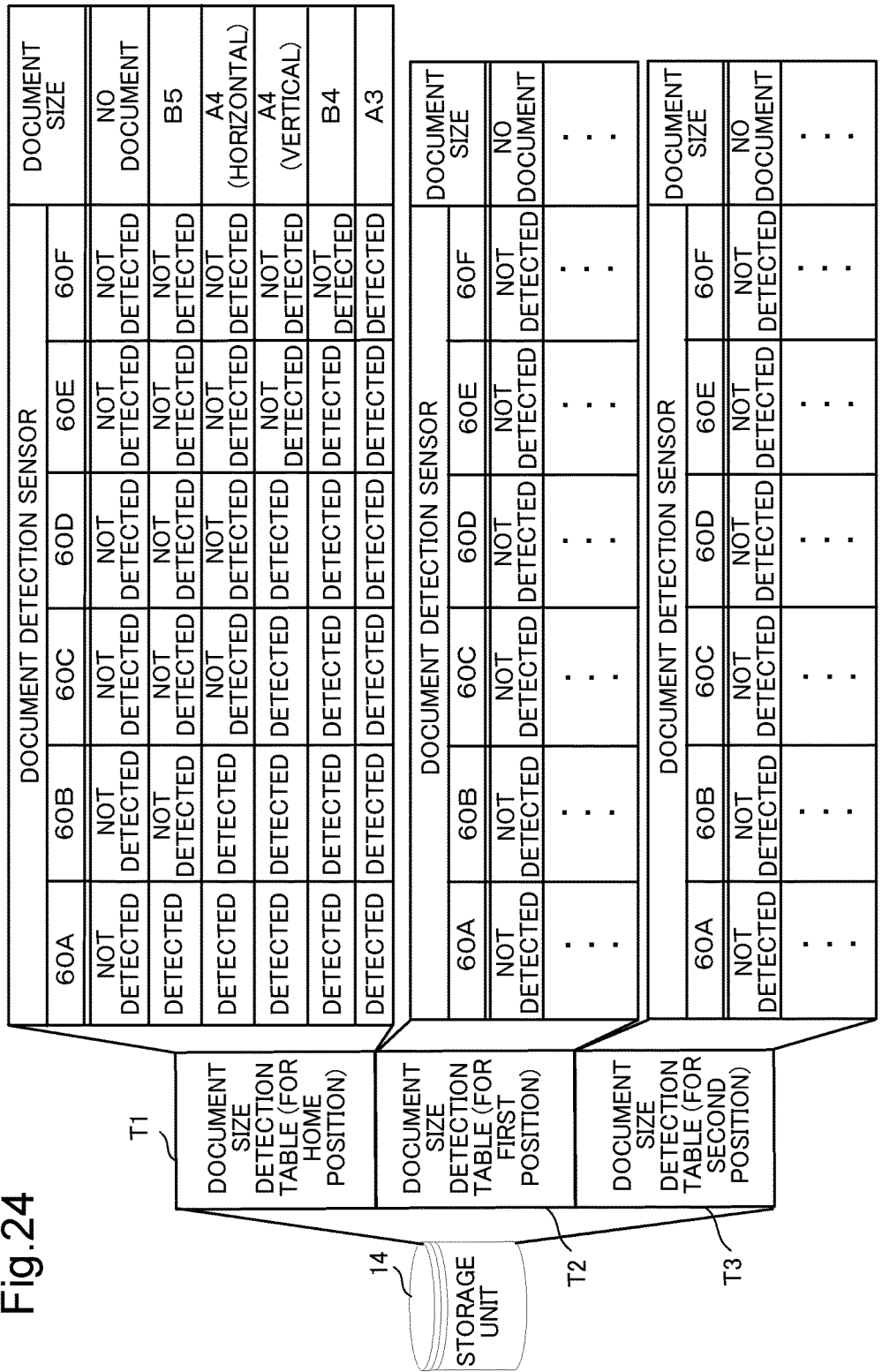
FIG. 24 is a diagram showing an example of data stored in a storage unit of the image reading device according to Embodiment 2.

Here, as shown in FIG. 24, a document size detection table is stored in the storage unit 14. A document size detection table T1 shows the relationship between outputs of the detection signals of the document detection sensors 60A to 60F when the scanner 40 is located at the home position and the size of a document. The document size detection unit 102 determines the size of a document loaded on the loading plate 32 according to the document size detection table T1. For example, when a detection signal indicating that there is a document above is output from all of the sensors among the document detection sensors 60A to 60F, the document size detection unit 102 detects that an A3 size document is loaded on the loading plate 32. In addition, for example, when a detection signal indicating that there is a document above is output from sensors 60A to 60D among the document detection sensors and a detection signal indicating that there is no document is output from sensors 60E and 60F among the document detection sensors, the document size detection unit 102 detects that an A4 (vertical) size document is loaded on the loading plate 32. In this manner, the document size detection unit 102 can detect documents with document sizes from A3 size to B5 size on the basis of detection signals output from the document detection sensors 60A to 60F.

As described above, according to the image reading device 10 of Embodiment 2, when the document detection sensor 60 is provided in the flat cable 36, since it is possible to transmit a detection signal output from the document detection sensor 60 to the control unit 100 using the flat cable 36, it is possible to simplify a wiring structure in the device. In addition, in the image reading device 10 according to Embodiment 2, since the flat cable 36 is disposed so that the width direction of the flat surface follows the direction orthogonal to the bottom surface of the loading plate 32, the document detection sensor 60 with which the detection direction faces the side on the bottom surface of the loading plate 32 can be provided.

Modified Examples

As shown in FIG. 24, the plurality of document size detection tables T1 to T3 are stored in the storage unit 14. The document size detection table T2 shows the relationship between outputs of detection signals of the document detection sensors 60A to 60F when the scanner 40 is located at a first position that is a predetermined distance away from the home position, and the size of the document. In addition, the document size detection table T2 shows the relationship between outputs of detection signals of the document detection sensors 60A to 60F when the scanner 40 is located at a second position that is a predetermined distance away from the home position and the size of the document.

First, the document size detection unit 102 identifies the size of the document based on the detection signal output from the document detection sensors 60A to 60F when the scanner 40 is located at the home position. In this case, depending on an output value of the detection signals of the document detection sensors 60A to 60F, the size of the document may not be identified. For example, when a detection signal indicating that there is a document above is output from the document detection sensor 60A to the document detection sensor 60C and a detection signal indicating that there is no document above is output from the document detection sensors 60D to 60E, it is not possible to identify the size of the document if the document size detection table T1 is referred to. In this case, the document size detection unit 102 moves the scanner 40 from the home position to a predetermined first position. When the scanner 40 moves from the home position to the predetermined first position, positions of the document detection sensors 60A to 60F also change. The document size detection unit 102 refers to the document size detection table T2 and identifies the size of the document based on detection signals output from the document detection sensors 60A to 60F. Since positions of the document detection sensors 60A to 60F change after the scanner 40 is located at the home position, it is possible to identify a document with a special size that cannot be identified when the scanner 40 is located at the home position.

In addition, when the document size detection unit 102 cannot identify the size of the document on the basis of the detection signal output from the document detection sensors 60A to 60F when the scanner 40 is located at the predetermined first position, the document size detection unit 102 again moves the scanner 40 and moves it to a predetermined second position. Then, the document size detection unit 102 refers to the document size detection table T3 and identifies the size of the document based on detection signals output from the document detection sensors 60A to 60F when the scanner 40 is located at the predetermined second position.

As described above, in the image reading device 10 according to the modified example, when the document size detection unit 102 cannot identify the size of the document based on detection signals output from the document detection sensors 60A to 60F when the scanner 40 is located at the home position, the scanner 40 is moved from the home position to a predetermined position. Then, the document size detection unit 102 determines the size of the document loaded on the loading plate 32 on the basis of detection signals output from the document detection sensors 60A to 60F when the scanner is located at a predetermined position in addition to detection signals output from the document detection sensors 60A to 60F when the scanner 40 is located at the home position. Accordingly, it is possible to identify the size of the document in more detail.

<Supplement>

The configuration shown in the above embodiment and the configuration shown in the above modified example may be combined. For example, the configuration of the flat cable according to Modified Example 6 shown in FIG. 16C may be applied to other embodiments and modified examples.

In addition, a control program described in the above embodiment and the above modified example may be recorded in a computer readable non-temporary recording medium, for example, a hard disk, a CD-ROM, a DVD-ROM, a semiconductor memory, or the like.

While the present disclosure has been described in detail with reference to the embodiments thereof, it would be apparent to those skilled in the art the various changes and modifications may be made therein within the scope defined by the appended claims.

What is claimed is:

1. An image reading device comprising:
   a loading plate on which a document to be read is loaded;
   a box-shaped frame that supports the loading plate;
   a scanner which includes a reading mechanism that extends in a main scanning direction and reciprocates in a sub-scanning direction on the side of a bottom surface opposite to an upper surface on which a document on the loading plate in the frame is loaded;
   a flat cable which has a planar flat surface and includes one end that is connected to a cable port provided in the scanner and the other end that is connected to the frame and extends in the frame so that a width direction of the flat surface follows a direction orthogonal to the bottom surface of the loading plate; and
   a holding member that reciprocates together with the scanner and holds a part of the flat cable from the side on a main surface of the frame,
   wherein the cable port is provided on a side surface of the scanner positioned on a side opposite to a position of the frame in the sub-scanning direction to which the other end of the flat cable is connected and is provided at an end of one side of the side surface in the main scanning direction,
   the flat cable includes a first extending part which extends from the one end to one side in the sub-scanning direction, a curved part which is continuous with the first extending part and folded back from the one side in the sub-scanning direction to the other side on the opposite side, and a second extending part which is continuous with the curved part and extends to the other side in the sub-scanning direction and in which the other end is connected to the frame, and the holding member is provided on the one side of the scanner in the main scanning direction and holds a part of the second extending part of the flat cable.

2. The image reading device according to claim 1, wherein the holding member includes a bottom wall part in contact with the side on the main surface of the flat cable, and a first wall part and a second wall part which protrude from the bottom wall part to the side of the bottom surface of the loading plate and which are juxtaposed with an interval of a length equal to or greater than the thickness of the flat cable therebetween, and the second extending part of the flat cable is inserted between the first wall part and the second wall part.

3. The image reading device according to claim 1, wherein the cable port extends in a direction orthogonal to the bottom surface of the loading plate, and a frame fixing part fixing the other end of the flat cable is provided on a side surface orthogonal to the loading plate of the frame so that the width direction of the flat surface follows the direction orthogonal to the bottom surface of the loading plate.

4. The image reading device according to claim 1, wherein the holding member is provided at a position which is below the loading plate in the frame and at which observation is possible through the loading plate in a top view.

5. An image forming device comprising:

the image reading device according to claim 1; and an image forming unit that forms an image read by the image reading device on recording paper.

6. An image reading device comprising:

a loading plate on which a document to be read is loaded;

a box-shaped frame that supports the loading plate;

a scanner which includes a reading mechanism that extends in a main scanning direction and reciprocates in a sub-scanning direction on the side of a bottom surface opposite to an upper surface on which a document on the loading plate in the frame is loaded;

a flat cable which has a planar flat surface and includes one end that is connected to a cable port provided in the scanner and the other end that is connected to the frame and extends in the frame so that a width direction of the flat surface follows a direction orthogonal to the bottom surface of the loading plate; and a holding member that reciprocates together with the scanner and holds a part of the flat cable from the side on a main surface of the frame, wherein the cable port is provided on a side surface of the scanner positioned on the side of the position of the frame to which the other end of the flat cable is connected, the flat cable includes a first extending part that extends from the one end, a second extending part that extends from the other end, and a curved part that connects the first extending part and the second extending part, and the holding member is provided on the side of the cable port of the scanner and holds a part of the first extending part of the flat cable.

7. The image reading device according to claim 6, wherein protrusions in which a part of the flat surface protrudes in a direction orthogonal to the flat surface are formed on the first extending part and the second extending part of the flat cable.

8. The image reading device according to claim 7, wherein a slide path is provided on a bottom surface of the frame, the slide path being formed so as to describe an arc toward the other side opposite to one side in the main scanning direction on which the cable port is provided on the side surface of the scanner and toward a side on which a home position is provided in the sub-scanning direction, and the image reading device includes a slide member that moves along the slide path and guides deformation of the flat cable in the frame.

* * * * *